(12) United States Patent
Imamura et al.

(10) Patent No.: US 9,643,595 B2
(45) Date of Patent: May 9, 2017

(54) POWER TRANSMISSION DEVICE FOR VEHICLE

(71) Applicant: DENSO CORPORATION, Kariya, Aichi-pref. (JP)

(72) Inventors: Tomonori Imamura, Nagoya (JP); Shinichirou Koshimoto, Kariya (JP); Hiroshi Okada, Kariya (JP); Tomohiro Saito, Chiryu (JP)

(73) Assignee: DENSO CORPORATION, Kariya (JP)

( * ) Notice: Subject to any disclaimer, the term of this patent is extended or adjusted under 35 U.S.C. 154(b) by 223 days.

(21) Appl. No.: 14/484,662

(22) Filed: Sep. 12, 2014

(65) Prior Publication Data

US 2014/0379195 A1    Dec. 25, 2014

Related U.S. Application Data

(62) Division of application No. 13/178,625, filed on Jul. 8, 2011, now abandoned.

(30) Foreign Application Priority Data

Jul. 8, 2010   (JP) .................................. 2010-155874
Feb. 2, 2011   (JP) .................................. 2011-20690

(51) Int. Cl.
*B60K 6/48*       (2007.10)
*B60W 20/30*    (2016.01)
(Continued)

(52) U.S. Cl.
CPC ............. *B60W 20/30* (2013.01); *B60K 6/442* (2013.01); *B60K 6/48* (2013.01); *B60K 6/54* (2013.01);
(Continued)

(58) Field of Classification Search
CPC .. F16H 2003/0803; F16H 3/091; F16H 3/093; F16H 37/065; Y10T 477/26;
(Continued)

(56) References Cited

U.S. PATENT DOCUMENTS 3,744,760 A    7/1973   Uher
4,335,429 A *  6/1982   Kawakatsu ............ B60K 6/387
                                              180/65.23

(Continued)

FOREIGN PATENT DOCUMENTS

JP    54-132928       10/1979
JP    01-0955944       4/1989
(Continued)

OTHER PUBLICATIONS

Japanese Office Action dated Mar. 13, 2012, issued in corresponding Japanese Application No. 2011-020690, with English translation.
(Continued)

*Primary Examiner* — Roger Pang
(74) *Attorney, Agent, or Firm* — Nixon & Vanderhye P.C.

(57) ABSTRACT

An output shaft is arranged to be lateral and parallel to engine input shafts and a motor input shaft. An engine side gear mechanism for transmitting a power of the engine input shafts to the output shaft is provided. A motor side gear mechanism for transmitting a power of the motor input shaft to the output shaft is provided. An input side clutch engages and disengages the engine input shafts and the motor input shaft. When the input side clutch is engaged, the power transmission between a position where the engine side gear mechanism is arranged on the engine input shafts and a position where the motor side gear mechanism is arranged on the motor input shaft is invariably possible.

22 Claims, 16 Drawing Sheets

(51) Int. Cl.
  *B60K 6/442* (2007.10)
  *B60K 6/547* (2007.10)
  *F16H 3/12* (2006.01)
  *B60K 6/54* (2007.10)
  *F16H 3/091* (2006.01)
  *B60K 6/44* (2007.10)
  *F16H 3/08* (2006.01)
  *F16H 3/093* (2006.01)
  *F16H 37/06* (2006.01)

(52) U.S. Cl.
  CPC .......... *B60K 6/547* (2013.01); *F16H 3/126* (2013.01); *B60K 6/44* (2013.01); *F16H 3/091* (2013.01); *F16H 3/093* (2013.01); *F16H 37/065* (2013.01); *F16H 2003/0803* (2013.01); *Y02T 10/6221* (2013.01); *Y02T 10/6234* (2013.01); *Y10S 903/902* (2013.01); *Y10T 74/19051* (2015.01); *Y10T 477/26* (2015.01)

(58) Field of Classification Search
  CPC .......... Y02T 10/6234; Y02T 10/6221; Y02T 10/6252; Y02T 10/6256; B60K 20/30; B60K 6/442; B60K 6/48; B60K 6/44
  USPC .......................................... 74/329, 330, 331
  See application file for complete search history.

(56) References Cited

U.S. PATENT DOCUMENTS

| | | | |
|---|---|---|---|
| 6,123,642 A | 9/2000 | Saito et al. | |
| 6,502,652 B2 | 1/2003 | Rogg | |
| 6,506,139 B2 | 1/2003 | Hirt et al. | |
| 7,625,311 B2 | 12/2009 | Dilzer | |
| 8,050,831 B2 | 11/2011 | Martin et al. | |
| 8,663,063 B2 * | 3/2014 | Saito ................... | B60W 20/00 477/5 |
| 2001/0022245 A1 | 9/2001 | Rogg | |
| 2002/0088291 A1 | 7/2002 | Bowen | |
| 2002/0098940 A1 | 7/2002 | Minowa et al. | |
| 2006/0021456 A1 | 2/2006 | Hughes | |
| 2006/0064225 A1 | 3/2006 | Tabata et al. | |
| 2007/0060432 A1 | 3/2007 | Van Druten et al. | |
| 2008/0314661 A1 | 12/2008 | Soliman et al. | |
| 2009/0118947 A1 | 5/2009 | Heap et al. | |
| 2009/0118949 A1 | 5/2009 | Heap et al. | |
| 2010/0078238 A1 | 4/2010 | Oba et al. | |
| 2010/0311540 A1 * | 12/2010 | Hellenbroich ........... | B60K 6/40 477/5 |
| 2013/0276576 A1 * | 10/2013 | Noguchi ............... | F16H 37/065 74/661 |

FOREIGN PATENT DOCUMENTS

| | | |
|---|---|---|
| JP | 7-303779 | 11/1995 |
| JP | 08-266012 | 10/1996 |
| JP | 9-123773 | 5/1997 |
| JP | 10-217779 | 8/1998 |
| JP | 11-99087 | 4/1999 |
| JP | 2000-245011 | 9/2000 |
| JP | 2000-279482 | 10/2000 |
| JP | 2002-114063 | 4/2002 |
| JP | P2003-165348 A | 6/2003 |
| JP | 2004-190497 | 7/2004 |
| JP | 2005-351381 | 12/2005 |
| JP | 2008-143260 | 6/2008 |
| JP | 2009-107626 | 5/2009 |

OTHER PUBLICATIONS

Office Action (6 pages) dated Oct. 29, 2013, issued in corresponding Chinese Application No. 201110193979.5 and English translation (5 pages).

Office Action (3 pages) dated Feb. 4, 2014, issued in corresponding Japanese Application No. 2012-106015 and English translation (3pages).

Office Action (3 pages) dated Feb. 4, 2014, issued in corresponding Japanese Application No. 2012-284139 and English translation (3pages).

Office Action (8 pages) dated Jan. 14, 2016, issued in corresponding Chinese Application No. 201410144235.8 and English translation (7 pages).

Office Action (8 pages) dated Feb. 1, 2016, issued in corresponding Chinese Application No. 201410145656.2 and English translation (7 pages).

Imamura, et al., Office Action dated Oct. 26, 2016, issued in copending U.S. Appl. No. 14/484,612 (11 pages).

* cited by examiner

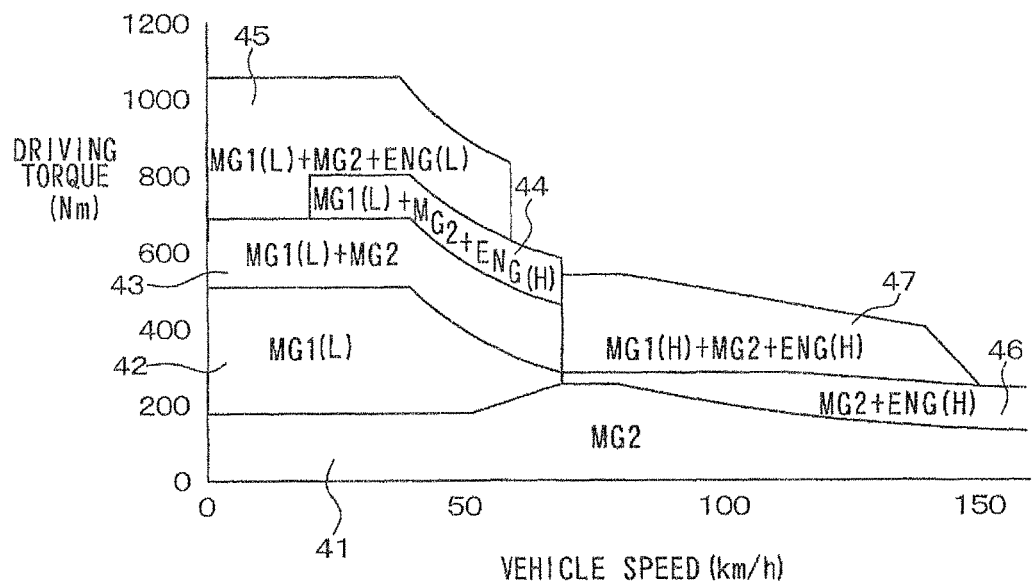
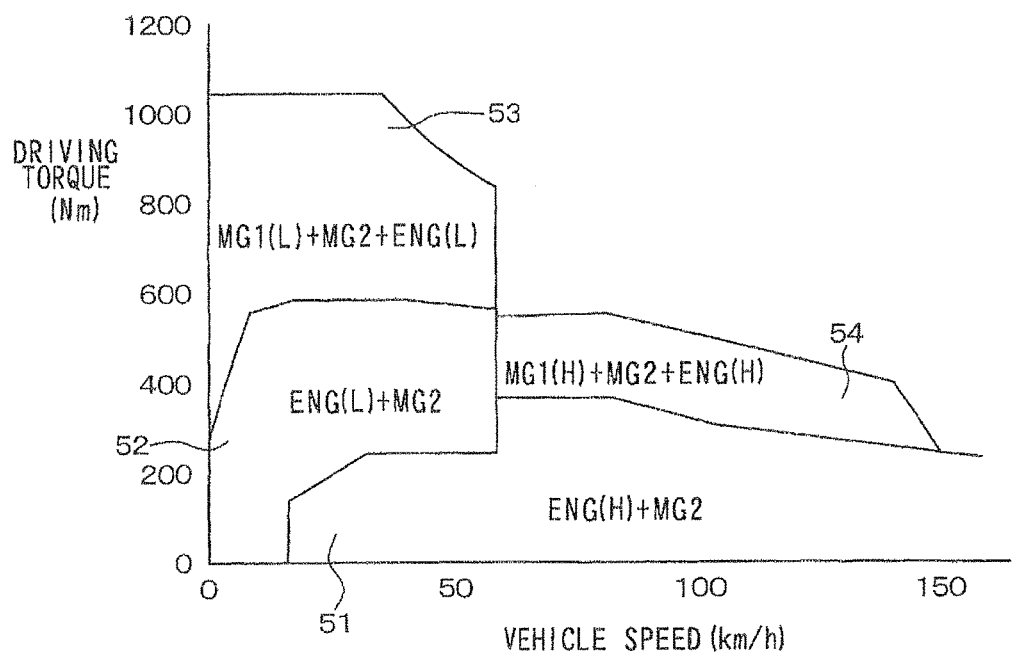

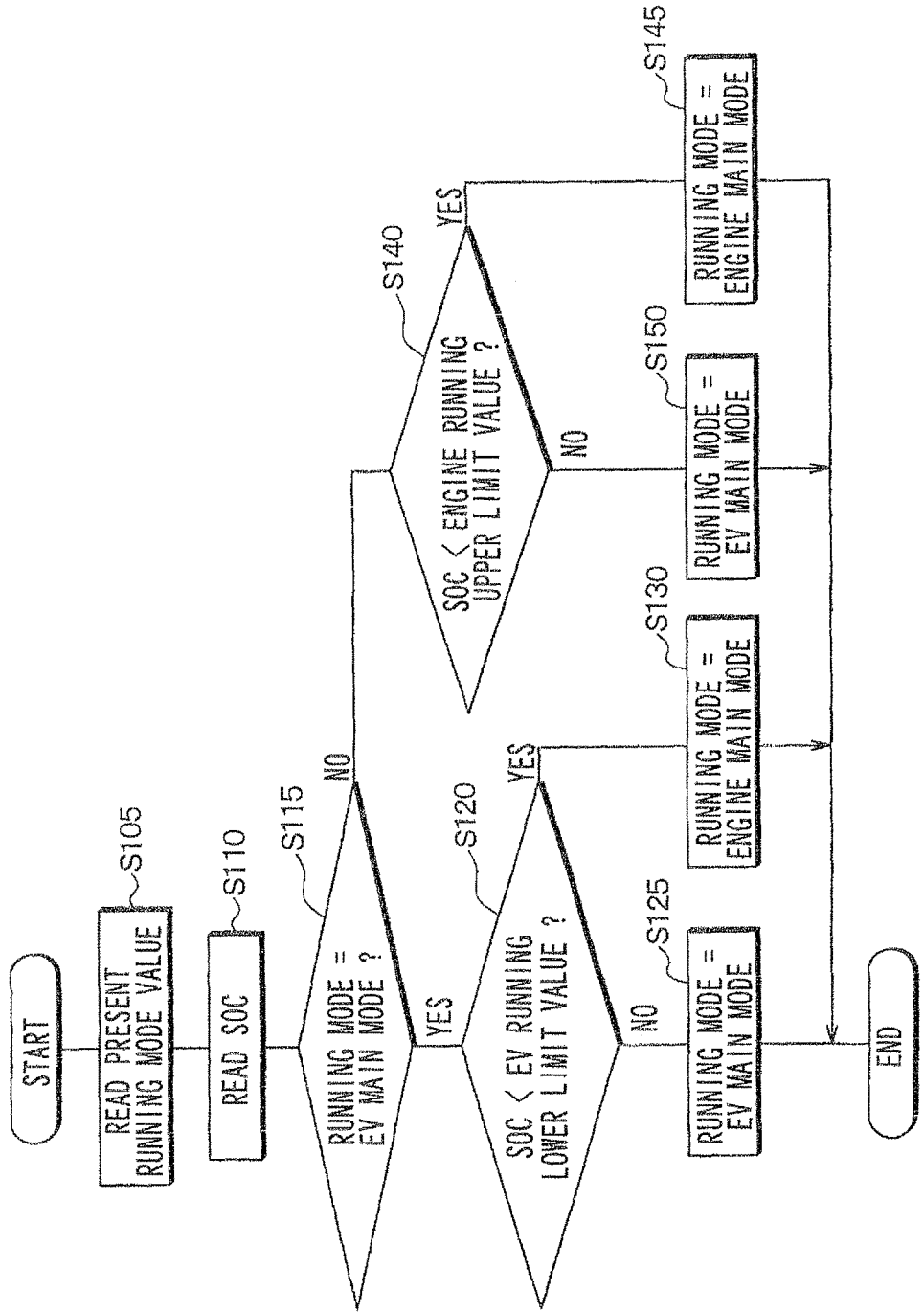

|  | 13a | 13b | 11 | 8 |
|---|---|---|---|---|
| ENG(L)+MG1(L) | ○ |  |  | ○ |
| ENG(M)+MG1(M) |  | ○ |  | ○ |
| ENG(H)+MG1(L) | ○ |  | ○ |  |
| ENG(H)+MG1(M) |  | ○ | ○ |  |
| ENG(H)+MG1(H) |  |  | ○ | ○ |
| MG1(L) | ○ |  |  |  |
| MG1(M) |  | ○ |  |  |
| ENG(H) |  |  | ○ |  |

POWER TRANSMISSION DEVICE FOR VEHICLE

CROSS REFERENCE TO RELATED APPLICATION

This is a divisional of U.S. application Ser. No. 13/178,625 filed on Jul. 8, 2011 which claims priority to and is based on Japanese Patent Application No. 2010-155874 filed on Jul. 8, 2010 and No. 2011-20690 filed on Feb. 2, 2011, the contents of each of which is incorporated herein by reference.

BACKGROUND OF THE INVENTION

1. Field of the Invention

The present invention relates to a power transmission device for a vehicle and is suitably used for a hybrid vehicle.

2. Description of Related Art

Conventionally, as a power transmission device used for a hybrid vehicle, there has been known a device described in Patent document 1 (JP-A-H09-123773). As shown in FIG. 1 of Patent document 1, the power transmission device has an engine input shaft 32, to which a power generated by an engine 51 is inputted, and a cylindrical first output shaft 33, to which second and fourth gears are attached. The power transmission device is structured such that the engine input shaft 32 and the cylindrical first output shaft 33 are engaged and disengaged by a first clutch 36. Also, the power transmission device has a cylindrical second output shaft 34, to which first and third gears are attached. The power transmission device is structured such that the engine input shaft 32 and the cylindrical second output shaft 34 are engaged and disengaged by a second clutch 37. A power generated by a motor 53 is also inputted to the second output shaft 34.

By employing such the construction, the engine 51 can use not only the second and fourth gears of the first output shaft 33 but also the first and third gears on the motor 53 side by engaging the second clutch 37. The motor 53 can use not only the first and third gears on the motor 53 side but also the second and fourth gears by engaging the first clutch 36 and the second clutch 37.

As described above, as a construction for increasing variations of gear selection, the power transmission device is structured such that the power can be transmitted from the engine input shaft 32 to the second and fourth gears and the first and third gears through the first clutch 36 and the second clutch 37 respectively. That is, the first to fourth gears can be commonly used by the engine 51 and the motor 53.

However, in the power transmission device of Patent document 1, it is necessary to provide the clutch 36 dedicated to a power transmission route from the engine input shaft 32 to the first output shaft 33 (second and fourth gears) and the clutch 37 dedicated to a power transmission route from the engine input shaft 32 to the second output shaft 34 (first and third gears) individually. Therefore, the number of the clutches is increased, and eventually an entire size of the power transmission device enlarges.

SUMMARY OF THE INVENTION

It is an object of the present invention to reduce as much as possible the number of clutches in a vehicular power transmission device that transmits a power of an engine and a power of a motor to an axle while enabling a gear mechanism to be commonly used by the engine and the motor.

According to a first example aspect of the present invention, a vehicular power transmission device transmits powers generated by an engine and a motor to an axle of a vehicle. The power transmission device has an engine input shaft, to which the power generated by the engine is inputted and which transmits the inputted power of the engine, a motor input shaft, to which the power generated by the motor is inputted and which transmits the inputted power of the motor, an output shaft for outputting the power to be transmitted to the axle, an engine side gear mechanism provided to the engine input shaft for transmitting the power of the engine input shaft to the output shaft not through the motor input shaft, a first motor side gear mechanism provided to the motor input shaft for transmitting the power of the motor input shaft to the output shaft not through the engine input shaft, and an input side clutch for engaging and disengaging the engine input shaft and the motor input shaft. When the input side clutch is engaged, the power transmission is enabled between the engine side gear mechanism on the engine input shaft and the first motor side gear mechanism on the motor input shaft.

With such the construction, by engaging the input side clutch, the engine and the motor can commonly use the engine side gear mechanism or the first motor side gear mechanism. If the input side clutch is disengaged, the motor can use the first motor side gear mechanism while the engine uses the engine side gear mechanism.

When the input side clutch is engaged, the power can be invariably transmitted between the position where the engine side gear mechanism is arranged and the position where the first motor side gear mechanism is arranged. This means that no clutch other than the input side clutch is disposed on the power transmission route from the position where the engine side gear mechanism is arranged to the first motor side gear mechanism. With such the construction, the number of the clutches can be reduced from the conventional art, so the size of the vehicular power transmission device can be reduced.

According to a second example aspect of the present invention, when the input side clutch is disengaged, the power of the engine input shaft and the power of the motor input shaft are enabled to be transmitted to the output shaft at different reduction gear ratios at the same time.

In this case, the rotation number of the motor can be made larger or smaller than the rotation number of the engine since the rotation number of the output shaft is the same.

According to a third example aspect of the present invention, a reduction gear ratio of the engine side gear mechanism is smaller than a reduction gear ratio of the first motor side gear mechanism.

With such the construction, the gear mechanism having the smaller reduction gear ratio than the motor is provided on the engine side. Therefore, the engine can use the gear mechanism having the small reduction gear ratio, which is frequently used by the engine in the hybrid vehicle in general, irrespective of the engagement/disengagement of the input side clutch. The motor can use the gear mechanism having the large reduction gear ratio, which is frequently used by the motor in the hybrid vehicle in general, irrespective of the engagement/disengagement of the input side clutch.

According to a fourth example aspect of the present invention, a reduction gear ratio of the engine side gear mechanism is the smallest among reduction gear ratios of gear mechanisms provided to the vehicular power transmission device. A reduction gear ratio of the first motor side gear mechanism is the largest among the reduction gear ratios of the gear mechanisms provided to the vehicular power transmission device.

With such the construction, the gear mechanism having the smallest reduction gear ratio is provided on the engine side, and the gear mechanism having the largest reduction gear ratio is provided on the motor side. Therefore, the engine can use the gear mechanism, which is frequently used by the engine in the hybrid vehicle in general, irrespective of the engagement/disengagement of the input side clutch. The motor can use the gear mechanism, which is frequently used by the motor in the hybrid vehicle in general, irrespective of the engagement/disengagement of the input side clutch.

According to a fifth example aspect of the present invention, the vehicular power transmission device further has a second motor side gear mechanism provided to the motor input shaft for transmitting the power of the motor input shaft to the output shaft not through the engine input shaft. A reduction gear ratio of the first motor side gear mechanism and a reduction gear ratio of the second motor side gear mechanism are larger than a reduction gear ratio of the engine side gear mechanism.

With such the construction, the engine can use the gear mechanism, which is frequently used by the engine in the hybrid vehicle in general, irrespective of the engagement/disengagement of the input side clutch. The motor can use the first or second motor side gear mechanism, which is frequently used by the motor in the hybrid vehicle in general, irrespective of the engagement/disengagement of the input side clutch.

According to a sixth example aspect of the present invention, the engine side gear mechanism is arranged between the first motor side gear mechanism and the engine.

In the power transmission device shown in FIG. 1 of Patent document 1, the first output shaft 33 is folded back at the clutch 36 toward the engine 51 side, and the second output shaft 34 is folded back at the clutch 37 toward the engine 51 side. Thus, the engine input shaft 32, the first output shaft 33 and the second output shaft 34 are formed as a coaxial three-layer structure.

However, in order to form the three-layer structure folded back at the clutches 36, 37 in this way, it is necessary to lengthen the engine input shaft 32 transmitting the power of the engine 51. As a result, an excessive mounting space is required and also resistance of the input shaft 32 against a torsional vibration lowers.

Therefore, according to the above-described sixth aspect of the present invention, the engine side gear mechanism is arranged between the first motor side gear mechanism and the engine. Thus, the distance from the engine to the engine side gear mechanism can be shortened. As a result, the mounting space can be reduced and the resistance of the engine input shaft against the torsional vibration can be maintained high.

According to a seventh example aspect of the present invention, in the vehicular power transmission device of the sixth example aspect of the present invention, the input side clutch is arranged between the engine side gear mechanism and the first motor side gear mechanism.

According to an eighth example aspect of the present invention, in the vehicular power transmission device of the sixth example aspect of the present invention, the input side clutch is arranged between the motor and the first motor side gear mechanism. The motor input shaft includes a cylindrical motor input shaft fixed to a portion of the input side clutch that rotates with the motor input shaft. The cylindrical motor input shaft coaxially surrounds another portion of the input side clutch that rotates with the engine input shaft and extends toward the engine to coaxially surround the engine input shaft. The cylindrical motor input shaft is structured to rotate with the other part of the motor input shaft. The first motor side gear mechanism is fixed to an end portion of the cylindrical motor input shaft closer to the engine between two end portions of the cylindrical motor input shaft.

With such the construction, the engine input shaft is supported by the cylindrical motor input shaft rotatably, and the cylindrical motor input shaft is supported by the engine input shaft rotatably. Therefore, the number of bearing members, which are provided separately for supporting the engine input shaft and the motor input shaft, can be small. Also, since the input side clutch is not arranged between the engine side gear mechanism and the first motor side gear mechanism, the unit consisting of the engine side gear mechanism and the first motor side gear mechanism can be made compact.

According to a ninth example aspect of the present invention, in the vehicular power transmission device of the sixth example aspect of the present invention, the input side clutch is arranged between the engine and the engine side gear mechanism. The engine input shaft includes a cylindrical engine input shaft fixed to a portion of the input side clutch that rotates with the engine input shaft. The cylindrical engine input shaft coaxially surrounds another portion of the input side clutch that rotates with the motor input shaft and extends toward the motor to coaxially surround the motor input shaft. The cylindrical engine input shaft is structured to rotate with the other part of the engine input shaft. The engine side gear mechanism is fixed to an end portion of the cylindrical engine input shaft closer to the motor between two end portions of the cylindrical engine input shaft.

With such the construction, the motor input shaft is supported by the cylindrical engine input shaft rotatably, and the cylindrical engine input shaft is supported by the motor input shaft rotatably. Therefore, the number of bearing members, which are provided separately for supporting the engine input shaft and the motor input shaft, can be small. Also, since the input side clutch is not arranged between the engine side gear mechanism and the first motor side gear mechanism, the unit consisting of the engine side gear mechanism and the first motor side gear mechanism can be made compact.

According to a tenth example aspect of the present invention, the motor is arranged between the engine and the first motor side gear mechanism. The engine side gear mechanism is arranged on a farther side of the first motor side gear mechanism from the engine.

With such the construction, the motor can be arranged in a space, in which a clutch, a torque converter and the like have been placed in a conventional vehicle. Thus, the space can be used effectively.

According to an eleventh example aspect of the present invention, in the vehicular power transmission device of the tenth example aspect of the present invention, the input side clutch is arranged between the motor and the engine.

According to a twelfth example aspect of the present invention, in the vehicular power transmission device of the tenth example aspect of the present invention, the input side clutch is arranged between the engine side gear mechanism and the first motor side gear mechanism.

According to a thirteenth example aspect of the present invention, the input side clutch is a clutch that transmits driving torque only from the engine input shaft side to the motor input shaft side. A reduction gear ratio of the motor side gear mechanism is larger than a reduction gear ratio of the engine side gear mechanism.

By adopting such a one-way clutch, it becomes unnecessary to control the engagement/disengagement of the input side clutch by using an actuator. As a result, it becomes unnecessary to provide the actuator. It is because the reduction gear ratio of the motor side gear mechanism is larger than the reduction gear ratio of the engine side gear mechanism.

According to a fourteenth example aspect of the present invention, the vehicular power transmission device further has a controller for controlling transmission routes and reduction gear ratios of the powers generated by the engine and the motor by controlling the engagement/disengagement of the input side clutch, the motor side gear mechanism and the engine side gear mechanism based on a physical quantity obtained within the vehicle. The controller selects operation modes of the engine and the motor allotted to the obtained physical quantity based on a predetermined switching map that allots the operation modes to a value of the physical quantity. The controller realizes the selected operation modes by controlling the engagement/disengagement of the input side clutch, the motor side gear mechanism and the engine side gear mechanism.

In this way, the switching map is used when the engagement/disengagement of the input side clutch, the motor side gear mechanism and the engine side gear mechanism is controlled to realize the decided operation modes. Thus, predetermined running providing good efficiency can be realized.

According to a fifteenth example aspect of the present invention, in the vehicular power transmission device of the fourteenth example aspect of the present invention, the motor rotates using an electric power of a battery mounted to the vehicle for driving the vehicle. The controller stores a plurality of kinds of switching maps beforehand. The controller obtains SOC, or a state of charge, of the vehicle driving battery. The controller selects one of the plurality of kinds of switching maps based on the obtained SOC.

With such the construction, the efficient running corresponding to the SOC of the vehicle driving battery can be realized.

BRIEF DESCRIPTION OF THE DRAWINGS

Features and advantages of embodiments will be appreciated, as well as methods of operation and the function of the related parts, from a study of the following detailed description, the appended claims, and the drawings, all of which form a part of this application. In the drawings:

FIG. 9 is a diagram showing a switching map in an EV main mode according to the first embodiment;

FIG. 10 is a diagram showing a switching map in an engine main mode according to the first embodiment;

FIG. 11 is a flowchart showing processing executed by the controller according to the first embodiment;

DETAILED DESCRIPTION OF EXAMPLE EMBODIMENT

First Embodiment

Figure 1:
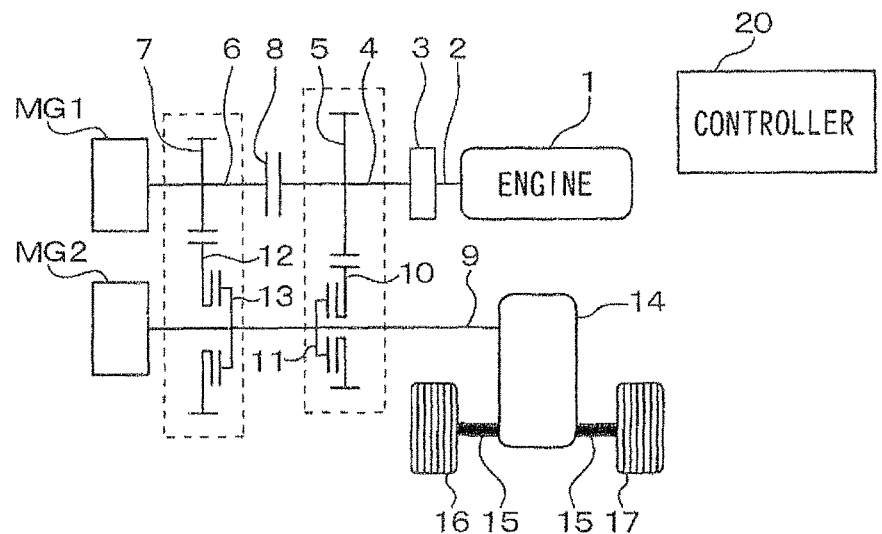
FIG. 1 is a skeleton diagram showing a construction of a vehicular power transmission device according to a first embodiment of the present invention.

Hereinafter, a first embodiment of the present invention will be described with reference to the drawings. FIG. 1 is a skeleton diagram showing a construction of a vehicular power transmission device according to the first embodiment. The vehicular power transmission device according to the present embodiment is mounted to a hybrid vehicle. The vehicular power transmission device has an engine 1, motors MG1, MG2, a first engine input shaft 2, a damper 3, a second engine input shaft 4, a first drive gear 5, a first motor input shaft 6, a second drive gear 7, an input side clutch 8, an output shaft 9, a first driven gear 10, a first output side clutch 11, a second driven gear 12, a second output side clutch 13, and a differential gear 14. The vehicular power transmission device transmits powers (i.e., driving torque) generated by the engine 1 and the motors MG1, MG2 to an axle 15, thereby generating driving forces in driving wheels 16, 17.

The engine 1 is an internal combustion engine. The motors MG1, MG2 are electric motors rotated by an electric power of a battery mounted to the vehicle for driving the vehicle (i.e., vehicle driving battery (not shown)). At the same time, the motors MG1, MG2 are generators that generate the electric power by using axial torque transmitted from the vehicular power transmission device (more specifically, first motor input shaft 6 for motor MG1, and output shaft 9 for motor MG2) and charge the vehicle driving battery.

The power generated by the engine 1 is inputted to the first engine input shaft 2 extending from the engine 1. The first engine input shaft 2 functions as a shaft for transmitting the power inputted from the engine 1. The well-known torsion damper 3 is fixed to an end portion of the first engine input shaft 2 on a side opposite from the engine 1.

The second engine input shaft 4 is fixed to a side of the damper 3 opposite to the first engine input shaft 2 coaxially with the first engine input shaft 2. Therefore, the second engine input shaft 4 is structured to transmit the power of the first engine input shaft 2 through the damper 3.

The first drive gear 5 is pivotally fixed to the second engine input shaft 4 such that the first drive gear 5 can rotate with the second engine input shaft 4.

The power generated by the motor MG1 is inputted to the first motor input shaft 6 extending from the motor MG1. The first motor input shaft 6 functions as a shaft for transmitting the power inputted from the motor MG1.

The second drive gear 7 is pivotally fixed to the first motor input shaft 6 such that the second drive gear 7 can rotate with the first motor input shaft 6.

The second engine input shaft 4 and the first motor input shaft 6 are arranged to be parallel and coaxial to each other. The input side clutch 8 is a clutch mechanism arranged between the second engine input shaft 4 and the first motor input shaft 6 for engaging/disengaging the second engine input shaft 4 and the first motor input shaft 6 coaxially. A wet clutch or a dry clutch may be used as the input side clutch 8.

The power generated by the motor MG2 is inputted to the output shaft 9 extending from the motor MG2. The output shaft 9 is arranged to be lateral and parallel to the first engine input shaft 2, the second engine input shaft 4 and the first motor input shaft 6. The output shaft 9 outputs the power to be transmitted to the differential gear 14, the axle 15 and the like.

The first driven gear 10 meshes with the first drive gear 5 and is supported by the output shaft 9 rotatably. The first output side clutch 11 is a clutch mechanism fixed to the output shaft 9 for engaging/disengaging the output shaft 9 and the first driven gear 10. A wet clutch or a dry clutch may be used as the first output side clutch 11. Alternatively, a meshing clutch such as a synchronization mechanism may be employed as the first output side clutch 11.

The second driven gear 12 meshes with the second drive gear 7 and is supported by the output shaft 9 rotatably. The second output side clutch 13 is a clutch mechanism fixed to the output shaft 9 for engaging/disengaging the output shaft 9 and the second driven gear 12. A wet clutch or a dry clutch may be used as the second output side clutch 13. Alternatively, a meshing clutch such as a synchronization mechanism may be employed as the second output side clutch 13.

The power of the output shaft 9 is transmitted to the driving wheels 16, 17 through a final gear (not shown), the differential gear 14 and the axle 15.

In the vehicular power transmission device having the above-described construction, if the first output side clutch 11 is engaged, the power transmission is performed between the output shaft 9 and the first driven gear 10. Therefore, the power transmission is performed between the second engine input shaft 4 and the output shaft 9 through the first drive gear 5, the first driven gear 10 and the first output side clutch 11 (not through first motor input shaft 6). If the first output side clutch 11 is disengaged, the power transmission between the second engine input shaft 4 and the output shaft 9 through the first drive gear 5, the first driven gear 10 and the first output side clutch 11 is not performed. The first drive gear 5, the first driven gear 10 and the first output side clutch 11 constitute a high gear mechanism (corresponding to example of engine side gear mechanism). A reduction gear ratio of the high gear mechanism is the smallest among reduction gear ratios of gear mechanisms provided to the vehicular power transmission device.

If the second output side clutch 13 is engaged, the power transmission is performed between the output shaft 9 and the second driven gear 12. Therefore, the power transmission is performed between the first motor input shaft 6 and the output shaft 9 through the second drive gear 7, the second driven gear 12 and the second output side clutch 13 (not through engine input shafts 2, 4). If the second output side clutch 13 is disengaged, the power transmission between the first motor input shaft 6 and the output shaft 9 through the second drive gear 7, the second driven gear 12 and the second output side clutch 13 is not performed. The second drive gear 7, the second driven gear 12 and the second output side clutch 13 constitute a low gear mechanism (corresponding example of first motor side gear mechanism). A reduction gear ratio of the low gear mechanism is the largest among the reduction gear ratios of the gear mechanisms provided to the vehicular power transmission device. Therefore, the reduction gear ratio of the low gear mechanism is larger than the reduction gear ratio of the high gear mechanism.

In this way, in the vehicular power transmission device, the gear mechanism closer to the engine 1 is the high gear mechanism and the gear mechanism closer to the motor MG1 is the low gear mechanism in terms of both of the power transmission route and the arrangement.

If the input side clutch 8 is engaged, the power is transmitted between the second engine input shaft 4 and the first motor input shaft 6 through the input side clutch 8. If the input side clutch 8 is disengaged, the power transmission between the second engine input shaft 4 and the first motor input shaft 6 through the input side clutch 8 is not performed.

If the input side clutch 8 is engaged, the power transmission is invariably possible from a position where the first drive gear 5 is arranged on the second engine input shaft 4 to a position where the second drive gear 7 is arranged on the first motor input shaft 6. In other words, there is no clutch other than the input side clutch 8 on the power transmission route on the input shafts 2, 4, 6 from the position where the first drive gear 5 is provided to the second drive gear 7. With such the construction, the number of the clutches can be reduced from conventional arts, so the size of the vehicular power transmission device can be reduced.

By arranging the input side clutch 8 and the first drive gear 5 in the positions between the second drive gear 7 and the engine 1, the distance from the engine 1 to the first drive gear 5 can be reduced. As a result, resistance of the engine input shafts 2, 4 against a torsional vibration can be maintained high.

By arranging the input side clutch 8 and the second drive gear 7 in the positions between the first drive gear 5 and the motor MG1, the distance from the motor MG1 to the second drive gear 7 can be reduced. As a result, resistance of the first motor input shaft 6 against the torsional vibration can be maintained high.

The engine side gear mechanism 5, 10, 11 is structured to transmit the power from a certain position on the power transmission route, which extends from the engine 1 to the input side clutch 8 along the engine input shafts 2, 4, to the output shaft 9. Therefore, there is no need to divide the power transmission route of the engine 1 into two routes of a route from the engine 1 to the first drive gear 5 and a route from the engine 1 to the second drive gear 7 as in Patent document 1. Accordingly, the construction is simplified.

The vehicular power transmission device has a controller 20 (transmission controller). The controller 20 controls driving/non-driving of the above-mentioned motors MG1, MG2 and engagement/disengagement of the input side clutch 8, the first output side clutch 11 and the second output side clutch 13 based on various physical quantities obtained within the vehicle. Thus, the controller 20 controls the transmission routes and the reduction gear ratios of the powers generated by the engine 1 and the motor MG1. An electronic controller having a microcontroller, which executes programs, is used as the controller 20, for example.

Figure 2:
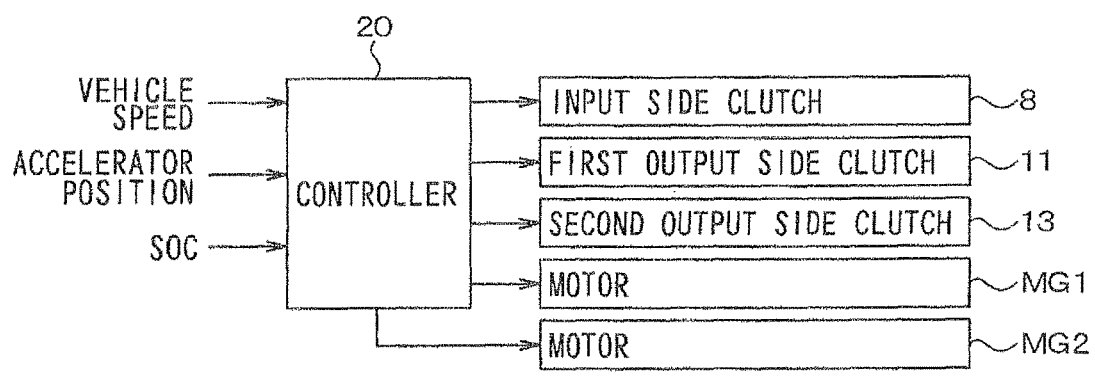
FIG. 2 is a diagram showing an input-output relation of a controller according to the first embodiment.

More specifically, as shown in FIG. 2, the controller 20 receives inputs of a vehicle speed signal indicating running speed of the vehicle, an accelerator position signal indicating an accelerator position, a SOC signal indicating SOC (State Of Charge) showing a charging rate of the vehicle driving battery and the like. As the vehicle speed signal, a signal outputted from a wheel speed sensor mounted to each wheel is used, for example. As the accelerator position signal, a signal outputted from an accelerator position sensor is used, for example. As the SOC signal, a signal outputted from a battery monitoring device that senses and outputs the SOC of the vehicle driving battery is used.

The controller 20 switches between the engagement and the disengagement of the above-mentioned input side clutch 8, the first output side clutch 11 and the second output side clutch 13 based on the above-mentioned inputted signals. More specifically, the controller 20 switches between the engagement and the disengagement of the clutches 8, 11, 13 by controlling operations of actuators provided for the clutches 8, 11, 13 respectively for realizing corresponding engagement and disengagement (for example, actuators for generating oil pressure for engaging/disengaging clutches).

Such the control of the clutches 8, 11, 13 by the controller 20 enables both of the transmission of the power generated by the motor MG1 to the driving wheels 16, 17 through the low gear mechanism and the transmission of the power generated by the motor MG1 to the driving wheels 16, 17 through the high gear mechanism. Also the power generated by the engine 1 can be transmitted to the driving wheels 16, 17 through the low gear mechanism and can be transmitted to the driving wheels 16, 17 through the high gear mechanism.

Figure 3:
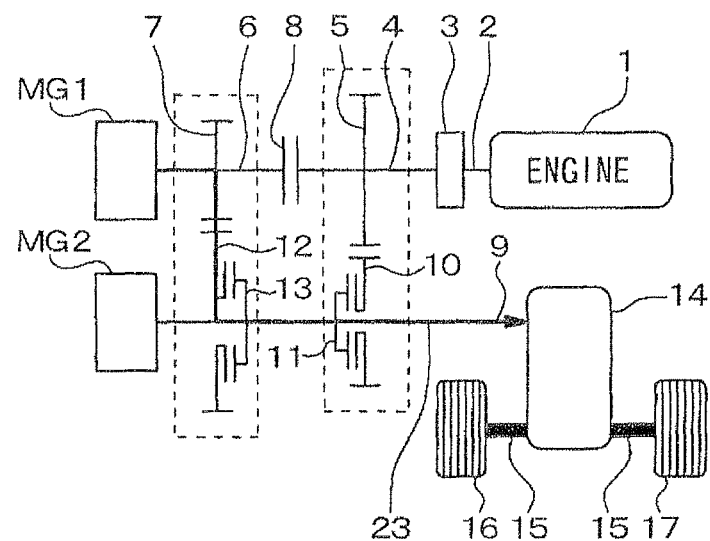
FIG. 3 is a diagram showing a power transmission route during a MG1(L) mode according to the first embodiment.

For example, in a MG1(L) mode shown in FIG. 3, the power of the motor MG1 is transmitted to the driving wheels 16, 17 through the low gear mechanism along a route shown by an arrow mark 23. In this mode, the second output side clutch 13 is engaged and the engagement/disengagement of the other clutches 8, 11 is arbitrary. However, all of the clutches 8, 11, 13 are not engaged at the same time.

Figure 4:
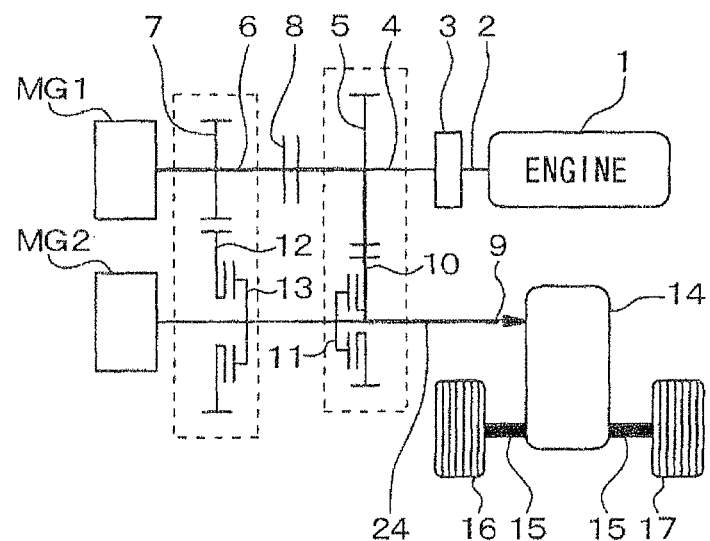
FIG. 4 is a diagram showing a power transmission route during a MG1(H) mode according to the first embodiment.

In a MG1(H) mode shown in FIG. 4, the power of the motor MG1 is transmitted to the driving wheels 16, 17 through the high gear mechanism along a route shown by an arrow mark 24. In this mode, the input side clutch 8 and the first output side clutch 11 are engaged respectively, and the second output side clutch 13 is disengaged.

Figure 5:
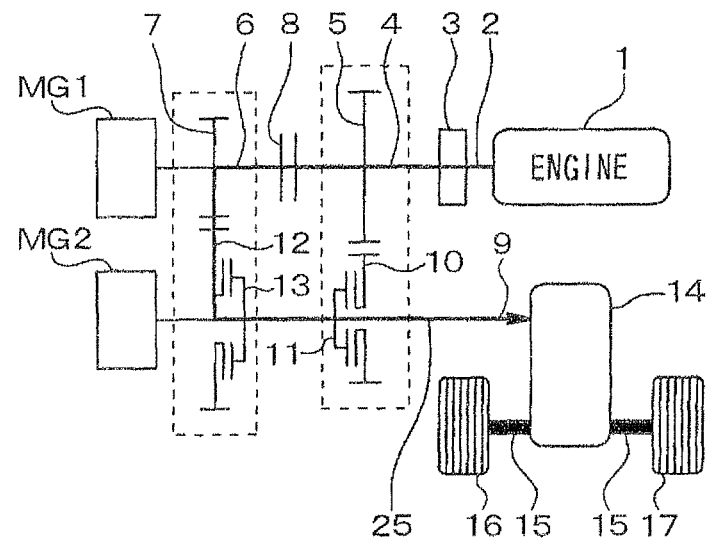
FIG. 5 is a diagram showing a power transmission route during an ENG(L) mode according to the first embodiment.

In an ENG(L) mode shown in FIG. 5, the power of the engine 1 is transmitted to the driving wheels 16, 17 through the low gear mechanism along a route shown by an arrow mark 25. In this mode, the input side clutch 8 and the second output side clutch 13 are engaged respectively, and the first output side clutch 11 is disengaged.

Figure 6:
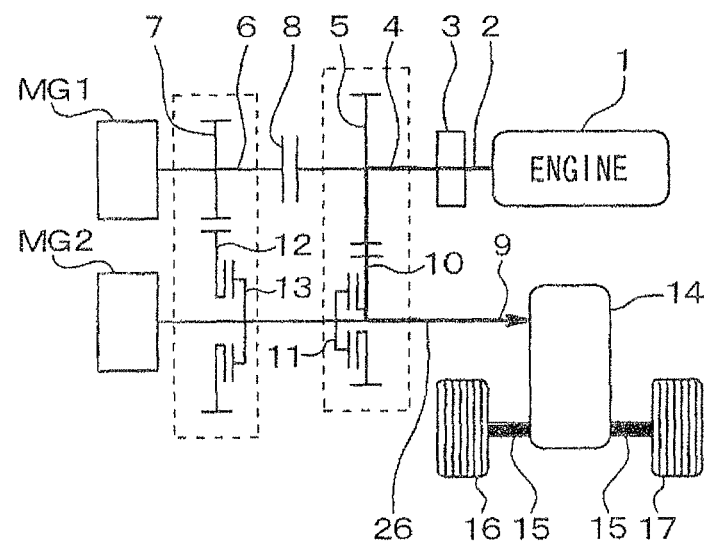
FIG. 6 is a diagram showing a power transmission route during an ENG(H) mode according to the first embodiment.

In an ENG(H) mode shown in FIG. 6, the power of the engine 1 is transmitted to the driving wheels 16, 17 through the high gear mechanism along a route shown by an arrow mark 26. In this mode, the first output side clutch 11 is engaged, and the engagement/disengagement of the other clutches 8, 13 is arbitrary. However, all the clutches 8, 11, 13 are not engaged at the same time.

Figure 7:
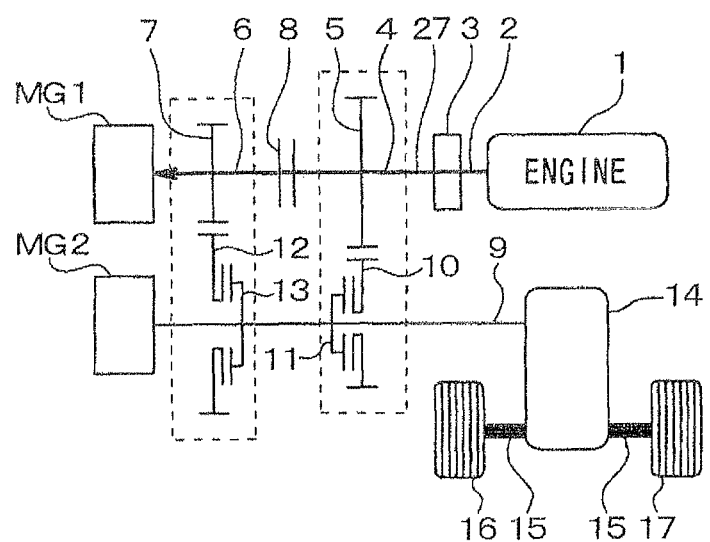
FIG. 7 is a diagram showing a power transmission route during a power generation mode according to the first embodiment.

In an electric power generation mode shown in FIG. 7, the power of the engine 1 is transmitted to the motor MG1 through the input side clutch 8 along a route shown by an arrow mark 27. In this mode, the input side clutch 8 is engaged, and the other clutches 11, 13 are disengaged. In the electric power generation mode, the motor MG1 generates an electric power by using the power of the engine 1 and can charge the driving battery. Such the mode can be realized when the vehicle stops. Such the mode can be realized also when the vehicle runs at low speed using the power generated by the motor MG2. Also, in-series operation for running the vehicle with the motor MG2 by using the electric power generated by the motor MG1 can be realized.

The above-mentioned driving modes of the motor MG1 (MG1(L) mode, MG1(H) mode) and the driving modes of the engine 1 (ENG(L) mode, ENG(H) mode) can be combined.

For example, when both of the motor MG1 and the engine 1 use the low gear mechanism, the above-mentioned MG1(L) mode and ENG(L) mode may be combined such that the input side clutch 8 and the second output side clutch 13 are engaged respectively, and the first output side clutch 11 is disengaged.

For example, when both of the motor MG1 and the engine 1 use the high gear mechanism, the above-mentioned MG1(H) mode and ENG(H) mode may be combined such that the input side clutch 8 and the first output side clutch 11 are engaged respectively, and the second output side clutch 13 is disengaged.

When the motor MG1 uses the low gear mechanism and the engine 1 uses the high gear mechanism, the above-mentioned MG1(L) mode and ENG(H) mode may be combined such that the first output side clutch 11 and the second output side clutch 13 are engaged respectively, and the input side clutch 8 is disengaged. In this way, different reduction gear ratios can be realized between the engine 1 and the motor MG1 at the same time. In this case, since the rotation speed of the output shaft 9 is the same, the rotation speed of the motor MG1 can be made larger than the rotation speed of the engine 1. Thus, operating points of the respective driving sources providing high efficiency respectively can be selected.

However, the clutches 8, 11, 13 cannot be controlled such that the motor MG1 uses the high gear mechanism and the engine 1 uses the low gear mechanism respectively. As explained in detail with reference to FIG. 8, a situation where the motor MG1 provides high efficiency by using the high gear mechanism is totally different from a situation where the engine 1 provides high efficiency by using the low gear mechanism. Therefore, even if these two situations cannot be realized at the same time, an adverse effect to a gas mileage of the vehicle is small.

The controller 20 is configured to realize the running suitable for the state of the vehicle by controlling the driving and non-driving of the motors MG1, MG2 in addition to the combination of the engagement and the disengagement of the clutches 8, 11, 13.

By combining the combination of the engagement and disengagement of the clutches 8, 11, 13 and the driving and non-driving of the motors MG1, MG2, the operation mode of the motor MG1 includes a non-driving mode for not transmitting the power to the output shaft 9, the MG1(L) mode, and the MG1(H) mode. The operation mode of the motor MG2 includes a non-driving mode for not generating the power and a driving mode for generating the power and inputting the power into the output shaft 9. The operation mode of the engine 1 includes a non-driving mode for not transmitting the power to the output shaft 9, the ENG(L) mode and the ENG(H) mode. The operation modes of the motors MG1, MG2 and the engine 1 can be combined except for certain combinations among them.

Figure 8:
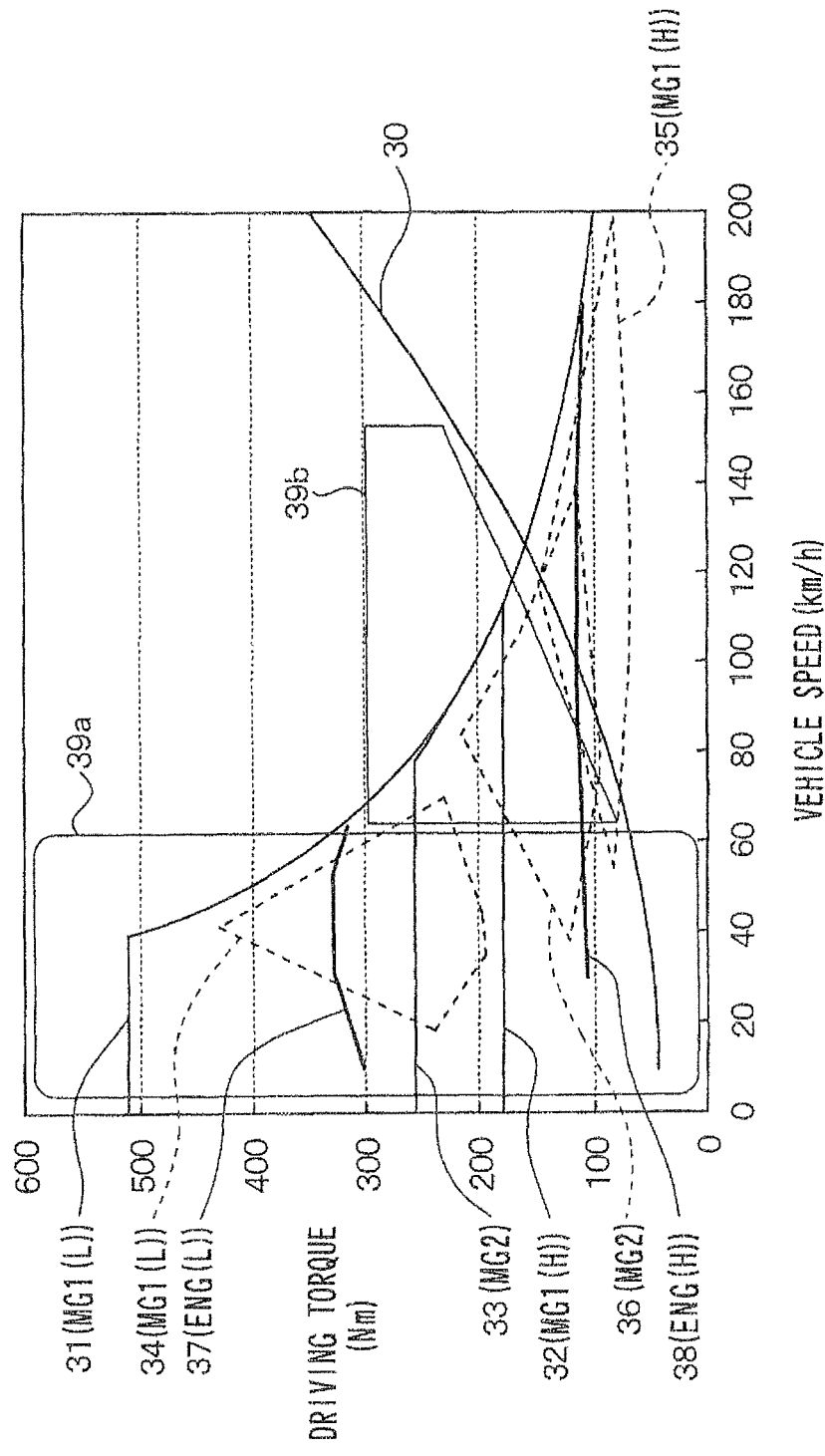
FIG. 8 is a graph showing characteristics of motors and an engine according to the first embodiment.

In order to explain the running suitable for the state of the vehicle, an example of characteristics of the motors MG1, MG2 and the engine 1 is shown in FIG. 8 as a graph.

In FIG. 8, a horizontal axis is vehicle speed and a vertical axis is driving torque of the axle 15. A solid line 30 shows necessary driving torque at respective vehicle speeds during flat-area constant-speed running, which is running on a flat area at constant speed. A solid line 31 shows an upper limit of the driving torque, which the motor MG1 can output (generate) at respective vehicle speeds in the MG1(L) mode. A solid line 32 shows an upper limit of the driving torque, which the motor MG1 can output (generate) at respective vehicle speeds in the MG1(H) mode. A solid line 33 shows an upper limit of the driving torque, which the motor MG2 can output (generate) at respective vehicle speeds.

An area 34 surrounded by a broken line shows an area where efficiency (equivalent to gas mileage) in the MG1(L) mode is assumed to be equal to or higher than a predetermined reference. An area 35 surrounded by a broken line shows an area where efficiency (equivalent to gas mileage) in the MG1(H) mode is assumed to be equal to or higher than a predetermined reference. An area 36 surrounded by a broken line shows an area where efficiency in the driving mode of the motor MG2 is assumed to be equal to or higher than a predetermined reference. A solid line 37 shows a range (maximum efficiency line) in which the efficiency is assumed to be the maximum in the ENG(L) mode. A solid line 38 shows a range (maximum efficiency line) in which the efficiency is assumed to be the maximum in the ENG(H) mode.

A basic concept of the selection of the operation modes of the motors MG1, MG2 and the engine 1 is as follows. That is, when the necessary driving torque can be realized only by the motor MG2, the vehicle is driven only by the motor MG2. In the other cases, the most efficient combination is selected in the relationship between the vehicle speed and the necessary driving torque.

Typically, in an area 39a from start to low-speed or middle-speed acceleration where the vehicle speed ranges from 0 km/h to approximately 60 km/h, the MG1(L) mode and the ENG(L) mode having the high efficiency area 34 and range 37 in the area 39a are used positively. In an area 39b of high-speed acceleration or hill-climbing where the vehicle speed ranges from approximately 60 km/h to approximately 150 km/h, the MG1(H) mode, the driving mode of the motor MG2 and the ENG(H) mode having the high efficiency areas 35, 36 and range 38 in or near the area 39b are used positively.

Next, flat-area constant-speed running in an EV main mode for driving the vehicle mainly with the motors MG1, MG2 will be explained as an example. The EV main mode is a running mode used when the SOC of the vehicle driving battery has a margin.

In the EV main mode, when the vehicle speed is lower than 130 km/h during the flat-area constant-speed running, the necessary driving torque is lower than the maximum driving torque of the motor MG2. Therefore, the running can be realized only with the power of motor MG2. That is, the motor MG1 and the engine 1 are brought to the non-driving modes, and the motor MG2 is brought to the driving mode. In order to do so, the controller 20 disengages all the clutches 8, 11, 13 and stops the motor MG1. At that time, since the motor MG1 can be stopped completely, loss due to dragged rotation of the motor MG1 can be reduced.

Even during the flat-area constant-speed running, when the vehicle speed exceeds 130 km/h, necessary driving torque cannot be covered only with the power of the motor MG2. Therefore, the running is performed in a mode for combining the ENG(H) mode and the MG1(H) mode and also for driving the motor MG2.

Next, as another example, flat-area constant-speed running in an engine main mode for driving the vehicle mainly with the engine 1 will be explained. The engine main mode is a running mode used when the SOC of the vehicle driving battery does not have the margin.

In the engine main mode, during the flat-area constant-speed running, in order to save the electric power of the vehicle driving battery, the driving mode of the motor MG2 and the ENG(H) mode are combined, and further, the non-driving mode of the motor MG1 is combined. In order to do so, the controller 20 engages the first output side clutch 11, disengages the clutches 8, 13 respectively, and stops the motor MG1. At that time, since the motor MG1 can be stopped completely, loss due to the dragged rotation of the motor MG1 can be reduced.

In order to efficiently utilize the characteristics of the motors MG1, MG2 and the engine 1 as shown in FIG. 8 in this way, a switching map in the EV main mode as shown in FIG. 9 and a switching map in the engine main mode as shown in FIG. 10 are stored in a storage medium (such as ROM or flash memory) of the controller 20 in advance (for example, in factory shipment).

The switching map shown in FIG. 9 is a data that partitions a two-dimensional plane defined by the vehicle speed and the driving torque into multiple blocks 41-47 and that allots a set of combination of the operation modes of the motors MG1, MG2 and the engine 1 to each of blocks 41-47 respectively. The switching map shown in FIG. 10 is a data that partitions a two-dimensional plane defined by the vehicle speed and the driving torque into multiple blocks 51-54 and that allots a set of combination of the operation modes of the motors MG1, MG2 and the engine 1 to each of blocks 51-54 respectively. In short, each switching map is a data that allots a set of the combination of the operation modes to the combination of the vehicle speed and the driving torque.

The controller 20 reads and executes a predetermined program to perform running mode switching processing as shown in FIG. 11 in each predetermined control cycle. Thus, the controller 20 switches the EV main mode and the engine main mode alternately.

More specifically, in each control cycle, first in S105 (S means "Step"), a present running mode is obtained by reading a running mode variable in a storage medium such as RAM. Then, in S110, a present SOC of the vehicle driving battery is obtained. In following S115, it is determined whether the running mode obtained in S105 is the EV main mode. If the present running mode is the EV main mode, S120 is executed subsequently. If the running mode is not the EV main mode (i.e., if running mode is engine main mode), S140 is executed subsequently.

In S120, it is determined whether the present SOC is lower than a predetermined EV running lower limit value. If the present SOC is not lower than the EV running lower limit value, the process proceeds to S125 subsequently. In S125, the running mode is maintained in the EV main mode by not rewriting the above-mentioned running mode variable. Then, the present running mode switching processing is ended. If it is determined that the present SOC is lower than the EV running lower limit value in S120, the running mode is switched to the engine main mode in S130 subsequently. In this case, a value representing the engine main mode is assigned to the running mode variable, and the present running mode switching processing is ended.

In S140, it is determined whether the present SOC is lower than a predetermined engine running upper limit value. If the present SOC is lower than the engine running upper limit value, the process proceeds to S145 subsequently. In order to provide hysteresis, the engine running upper limit value is set at a value larger than the EV running lower limit value. In S145, the running mode is maintained in the engine main mode by not rewriting the above-mentioned running mode variable. Then, the present running mode switching processing is ended. If it is determined that the SOC is not lower than the engine running upper limit value in S140, the running mode is switched to the EV main mode in S150 subsequently. In this case, a value representing the EV main mode is assigned to the above-mentioned running mode variable, and the present running mode switching processing is ended.

By the repetition of such the processing by the controller 20, while the running mode is the EV main mode and the SOC does not fall below the EV running lower limit value, the processing is performed in the order of S105, S110, S115, S120 and S125. Thus, the running mode is maintained in the EV main mode. If the SOC gradually decreases due to the use of the motors MG1, MG2 and falls below the EV running lower limit value, the processing is performed in the order of S105, S110, S115, S120 and S130. Thus, the running mode switches from the EV main mode to the engine main mode.

While the running mode is the engine main mode and the SOC is lower than the engine running upper limit value, the processing is performed in the order of S105, S110, S115, S140 and S145, so the running mode is maintained in the engine main mode. If the SOC gradually increases due to the electric power generation and the like and becomes equal to or higher than the engine running upper limit value, the processing is performed in the order of S105, S110, S115, S140 and S150, so the running mode switches from the engine main mode to the EV main mode.

Figure 12:
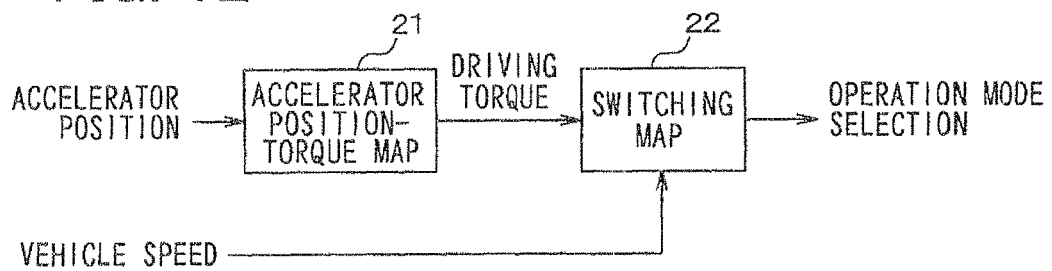
FIG. 12 is a block diagram showing processing for selecting an operation mode according to the first embodiment.

The controller 20 executes a predetermined program to obtain the current accelerator position and the current vehicle speed in each predetermined control cycle as shown in FIG. 12. The controller 20 selects the operation modes of the motors MG1, MG2 and the engine 1 based on the obtained accelerator position and vehicle speed. More specifically, the controller 20 calculates the necessary driving torque from the obtained accelerator position according to an accelerator position-torque map 21 beforehand stored in a storage medium (such as ROM or flash memory) of the controller 20. The accelerator position-torque map 21 is a data showing a correspondence relationship between the accelerator position and the driving torque necessary for the accelerator position.

The controller 20 selects a combination of the operation modes of the motors MG1, MG2 and the engine 1 corresponding to the calculated driving torque and the obtained vehicle speed based on the switching map 22 shown in FIG. 9 or 10.

More specifically, the switching map corresponding to the present running mode is used, and the block including the position of the combination of the calculated driving torque and the obtained vehicle speed is read from the switching map. Then, the combination of the operation modes of the motors MG1, MG2 and the engine 1 allotted to the block is selected.

Next, concrete contents of the block partitioning and the allotment of the switching maps shown in FIGS. 9 and 10 will be explained. In the switching map for the EV main mode of FIG. 9, a range of the driving torque equal to or lower than approximately 200 Nm provides a single block 41 across the entire vehicle speed range. A combination of the driving mode of the MG2, the non-driving mode of the motor MG1 and the non-driving mode of the engine 1 is allotted to the block 41. This combination is realized by disengaging the input side clutch 8, the first output side clutch 11 and the second output side clutch 13 respectively.

A block 42 covering a driving torque range immediately above the block 41 is defined in the range from start to low-speed or middle-speed acceleration ranging from 0 km/h to approximately 60 km/h. A combination of the MG1(L) mode, the non-driving mode of the motor MG2 and the non-driving mode of the engine 1 is allotted to the block 42. This combination is realized by disengaging the input side clutch 8 and the first output side clutch 11 respectively, by engaging the second output side clutch 13, and by idling the motor MG2 with the rotation of the output shaft 9 without driving the motor MG2. By doing so, the efficiency can be improved since the block 42 includes the high efficiency area 34 of the MG1(L) mode shown in FIG. 8.

A block 43 covering a driving torque range immediately above the block 42 is defined in the range from start to low-speed or middle-speed acceleration ranging from 0 km/h to approximately 60 km/h. A combination of the MG1(L) mode, the driving mode of the motor MG2 and the non-driving mode of the engine 1 is allotted to the block 43. This combination is realized by disengaging the input side clutch 8 and the first output side clutch 11 and by engaging the second output side clutch 13 respectively. By using the motors MG1, MG2 together in this way, while the power generated by the motor MG1 is the driving torque in or near the high efficiency area 34 of the MG1(L) mode shown in FIG. 8, the driving torque of the axle 15 larger than the high efficiency area 34 can be realized.

A block 44 covering a driving torque range immediately above the block 43 is defined in a vehicle speed range from 20 km/h to approximately 60 km/h. A combination of the MG1(L) mode, the driving mode of the motor MG2 and the ENG(H) is allotted to the block 44. This combination is realized by disengaging the input side clutch 8 and by engaging the first output side clutch 11 and the second output side clutch 13 respectively. By using the motors MG1, MG2 and the engine 1 together in this way, while the power generated by the motor MG1 is the driving torque in or near the high efficiency area 34 of the MG1(L) mode shown in FIG. 8 and the power generated by the engine 1 is the driving torque in or near the high efficiency range 38 of the ENG(H) mode shown in FIG. 8, the driving torque of the axle 15 larger than the high efficiency area 34 or range 38 can be realized.

Since the gear mechanisms used by the motor MG1 and the engine 1 can be differentiated from each other in this way, the range of selection of the operation modes can be widened. Specifically, as shown in FIG. 8, both the high efficiency area 34 of the MG1(L) mode and the high efficiency range 38 of the ENG(H) mode are included in the range 39a from start to low-speed or middle-speed acceleration where the vehicle speed is approximately 60 km/h or lower. Thus, the two high efficiency area 34 and range 38 can be used in combination.

A block 45 covering a driving torque range immediately above the blocks 43, 44 is defined in a range of the vehicle speed from approximately 20 km/h to approximately 60 km/h. A combination of the MG1(L) mode, the driving mode of the motor MG2 and the ENG(L) mode is allotted to the block 45. This combination is realized by engaging the input side clutch 8 and the second output side clutch 13 and by disengaging the first output side clutch 11 respectively. By using the motors MG1, MG2 and the engine 1 together in this way, while the power generated by the motor MG1 is the driving torque in or near the high efficiency area 34 of the MG1(L) mode shown in FIG. 8 and the power generated by the engine 1 is the driving torque in or near the high efficiency range 37 of the ENG(L) mode shown in FIG. 8, the driving torque of the axle 15 larger than the high efficiency area 34 or range 37 can be realized. Since the ENG(L) mode is used unlike the area 44, larger driving torque can be realized efficiently.

A block 46 covering a driving torque range immediately above the block 41 is defined in a range over approximately 60 km/h. A combination of the MG1 non-driving mode, the driving mode of the motor MG2 and the ENG(H) mode is allotted to the block 46. This combination is realized by disengaging the input side clutch 8 and the second output side clutch 13 and by engaging the first output side clutch 11 respectively. By using the motor MG2 and the engine 1 together in this way, while the power generated by the motor MG2 is the driving torque in or near the high efficiency area 36 of the MG2 driving mode shown in FIG. 8 and the power generated by the engine 1 is the driving torque in or near the high efficiency range 38 of the ENG(H) mode shown in FIG. 8, the driving torque of the axle 15 larger than the high efficiency area 36 or range 38 can be realized.

A block 47 covering a driving torque range immediately above the block 46 is defined in a range from approximately 60 km/h to approximately 150 km/h. A combination of the MG1(H) mode, the driving mode of the motor MG2 and the ENG(H) mode is allotted to the block 47. This combination is realized by disengaging the second output side clutch 13 and by engaging the input side clutch 8 and the first output side clutch 11 respectively. By using the motors MG1, MG2 and the engine 1 together in this way, while the power generated by the motor MG1 is the driving torque in or near the high efficiency area 35 of the MG1(H) mode shown in FIG. 8 and the power generated by the engine 1 is the driving torque in or near the high efficiency range 38 of the ENG(H) mode shown in FIG. 8, the driving torque of the axle 15 larger than the high efficiency area 35 or range 38 can be realized.

In this way, in the EV main mode, in the range 39a from start to low-speed or middle-speed acceleration, the controller 20 selects the driving source(s) in the MG2 single mode of the block 41, the MG1(L) single mode of the block 42, the MG1(L)+MG2 mode of the block 43, the MG1(L)+MG2+ENG(H) mode of the block 44, and the MG1(L)+MG2+ENG(L) mode of the block 45 in this order as the necessary driving torque increases. Also in the EV main mode, in the high-speed acceleration or hill-climbing range 39b, the controller 20 selects the driving source(s) in the MG2 single mode of the block 41, the MG2+ENG(H) mode of the block 46, and the MG1(H)+MG2+ENG(H) mode of the block 47 in this order as the request torque increases.

In the EV main mode, the input side clutch 8 is engaged only in the blocks 45, 47, in which the engine 1 and the motor MG1 use the same gear mechanism. Therefore, the input side clutch 8 does not operate unless the necessary driving torque becomes very large. Therefore, wear of the input side clutch 8 and friction plates of the input side clutch 8 can be reduced significantly. At the same time, a driving energy of an actuator can be reduced significantly.

Next, the contents of the switching map for the engine main mode shown in FIG. 10 will be explained. Differently from the EV main mode, the engine 1 is invariably used in the engine main mode to suppress a sudden fall of the SOC of the vehicle driving battery.

In the switching map for the engine main mode shown in FIG. 10, an area, whose upper boundary driving torque ranges approximately from 200 to 300 Nm, defines a single block 51 across the entire vehicle speed range except for a very low speed range (speed range lower than approximately 15 km/h). A combination of the driving mode of the MG2, the non-driving mode of the motor MG1 and the ENG(H) is allotted to the block 51. This combination is realized by disengaging the input side clutch 8 and the second output side clutch 13 respectively, by engaging the first output side clutch 11, and by stopping the motor MG1. At that time, since the motor MG1 can be stopped completely, loss due to dragged rotation of the motor MG1 can be reduced.

A block 52 is set to cover an area of the very low speed from 0 km/h to approximately 15 km/h and the driving torque of approximately 400 Nm or lower and to cover a driving torque range immediately above the block 51 in a range from start to low-speed or middle-speed acceleration ranging from approximately 15 km/h to approximately 60 km/h. A combination of the non-driving mode of the MG1, the driving mode of the motor MG2 and the ENG(L) mode is allotted to the block 52. This combination is realized by disengaging the first output side clutch 11, by engaging the input side clutch 8 and the second output side clutch 13 respectively, and by idling the motor MG1 with the rotation of the first motor input shaft 6 without driving the motor MG1. By doing so, the efficiency can be heightened since the block 52 includes the high efficiency range 37 of the ENG(L) mode shown in FIG. 8.

A block 53 covering a driving torque range immediately above the block 52 is defined in a range from start to low-speed or middle-speed acceleration ranging from 0 km/h to approximately 60 km/h. A combination of the MG1(L) mode, the driving mode of the MG2 and the ENG(L) mode is allotted to the block 53. This combination is realized by disengaging the first output side clutch 11 and by engaging the input side clutch 8 and the second output side clutch 13 respectively.

By using the motors MG1, MG2 and the engine 1 together in this way, while the power generated by the motor MG1 is the driving torque in or near the high efficiency area 34 of the MG1(L) mode shown in FIG. 8, while the power generated by the motor MG2 is the driving torque in or near the high efficiency area 36 of the driving mode of the MG2 shown in FIG. 8, and while the power generated by the engine 1 is the driving torque in or near the high efficiency range 37 in the ENG(L) mode shown in FIG. 8, the driving torque of the axle 15 larger than the high efficiency areas 34, 36 or range 37 can be realized. Since the MG1(L) mode is also used differently from the block 52, larger driving torque can be realized efficiently.

A block 54 covering a driving torque range immediately above the block 51 is defined in a range from approximately 60 km/h to approximately 150 km/h. A combination of the MG1(H) mode, the driving mode of the motor MG2 and the ENG(H) mode is allotted to the block 54. This combination is realized by disengaging the second output side clutch 13 and by engaging the input side clutch 8 and the first output side clutch 11 respectively.

By using the motors MG1, MG2 and the engine 1 together in this way, while the power generated by the motor MG1 is the driving torque in or near the high efficiency area 35 of the MG1(H) mode shown in FIG. 8, while the power generated by the motor MG2 is the driving torque in or near the high efficiency area 36 of the driving mode of the MG2 shown in FIG. 8, and while the power generated by the engine 1 is the driving torque in or near the high efficiency range 38 of the ENG(H) mode shown in FIG. 8, the driving torque of the axle 15 larger than the high efficiency areas 35, 36 or range 38 can be realized.

In this way, in the engine main mode, in the range of the very low speed lower than approximately 15 km/h, the controller 20 selects the driving sources in the ENG(L)+MG2 mode of the block 52 and the MG1(L)+MG2+ENG(L) mode of the block 53 in this order as the necessary driving torque increases. Also in the engine main mode, in the range of approximately 15 km/h or over in the low-speed or middle-speed acceleration range 39a, the controller 20 selects the driving sources in the ENG(H)+MG2 mode of the block 51, the ENG(L)+MG2 mode of the block 52, and the MG1(L)+MG2+ENG (L) mode of the block 53 in this order as the necessary driving torque increases. Also in the engine main mode, in the high-speed acceleration or hill-climbing range 39b, the controller 20 selects the driving sources in the ENG(H)+MG2 mode of the block 51 and the MG1(H)+MG2+ENG (H) mode of the block 54 in this order as the request torque increases.

As explained above, the controller 20 selectively uses the EV main mode for mainly using the motors MG1, MG2 or the engine main mode for mainly using the engine 1 according to the SOC of the vehicle driving battery. In each mode, the controller 20 selects the efficient combination from the combinations of the driving/non-driving and the reduction gear ratios of the motors MG1, MG2 and the engine 1 according to the necessary driving torque and the vehicle speed. In order to realize the selected combination, the controller 20 controls the engagement/disengagement of the input side clutch 8, the first output side clutch 11 and the second output side clutch 13 and the driving/non-driving of the motors MG1, MG2.

As shown in the switching maps of FIGS. 9 and 10, the ENG (H) mode is used more often than the ENG (L) mode and the MG1(L) mode is used more often than the MG1(H) mode in the area realized in the normal running (i.e., area of vehicle speed from 0 to 60 km/h and driving torque from 0 to 300 Nm).

In this way, in order to enable the operation in the areas 34, 35 where the efficiency of the motor MG1 is high in the range where the running speed is high or middle and the running cannot be realized only with the power of the motor MG1, the controller 20 switches the engagement/disengagement of the input side clutch 8, the first output side clutch 11 and the second output side clutch 13 such that the power transmission route of the motor MG1 can be selected between the high gear mechanism having the low reduction gear ratio and the low gear mechanism having the high reduction gear ratio.

When the running speed is high and the running can be performed only with the power of the engine 1, the controller 20 transmits the powers of the engine 1 and the motor MG2 to the driving wheels through the high gear mechanism, which is provided on the engine 1 side and which has the low reduction gear ratio, without engaging the input side clutch 8.

When the running speed is low and the running can be performed only with the power of the motor MG1, the controller 20 transmits the power of the motor MG1 to the driving wheels through the low gear mechanism, which is provided on the motor MG1 side and which has the high reduction gear ratio.

When the running speed is low and the running cannot be performed only with the power of the motor MG1, the controller 20 transmits the total power of the engine 1 and the motor MG1 to the axle 15 through the low gear mechanism, which is provided on the motor MG1 side and which has the high reduction gear ratio, by engaging the input side clutch 8.

Since the vehicular power transmission device is structured as explained above, if the input side clutch 8 is engaged, the high gear mechanism 5, 10, 11 on the engine side or the low gear mechanism 7, 12, 13 on the motor side can be used commonly by the engine 1 and the motor MG1. If the input side clutch 8 is disengaged, the engine 1 can use the high gear mechanism 5, 10, 11 while the motor MG1 can use the low gear mechanism 7, 12, 13.

The high gear mechanism having the lowest reduction gear ratio is provided on the engine 1 side, and the low gear mechanism having the highest reduction gear ratio is provided on the motor MG1 side. Therefore, the engine 1 can use the gear mechanism, which is frequently used by the engine 1 in the hybrid vehicle in general, irrespective of the engagement/disengagement of the input side clutch 8. The motor MG1 can use the gear mechanism, which is frequently used by the motor MG1 in the hybrid vehicle in general, irrespective of the engagement/disengagement of the input side clutch 8.

Second Embodiment

Figure 13:
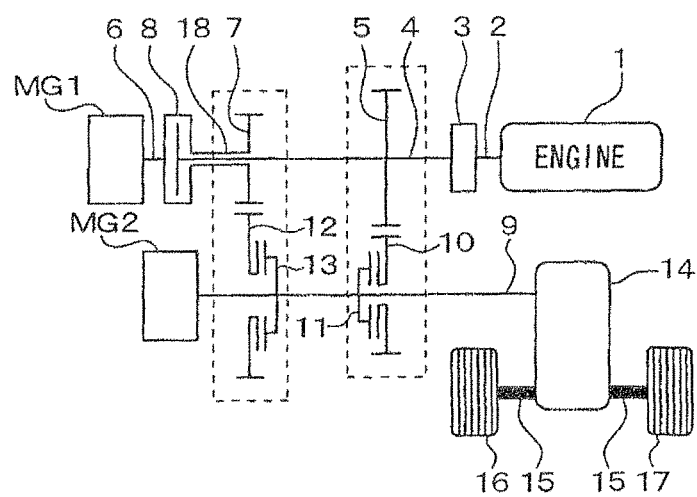
FIG. 13 is a skeleton diagram showing a construction of a vehicular power transmission device according to a second embodiment of the present invention.

Next, a second embodiment of the present invention will be described, focusing on differences from the first embodiment. As shown in FIG. 13, differently from the first embodiment, in the vehicular power transmission device according to the present embodiment, the input side clutch 8 that engages and disengages the first motor input shaft 6 and the second engine input shaft 4 is arranged between the motor MG1 and the second drive gear 7, not between the first drive gear 5 and the second drive gear 7.

In order to realize such the arrangement, a cylindrical motor input shaft 18 is attached to a portion of the input side clutch 8 that rotates with the first motor input shaft 6. The cylindrical motor input shaft 18 coaxially surrounds another portion of the input side clutch 8 that rotates with the second engine input shaft 4. The cylindrical motor input shaft 18 coaxially surrounds the second engine input shaft 4 and extends toward the engine 1. The cylindrical motor input shaft 18 rotates with the first motor input shaft 6. The second drive gear 7 is fixed not to the first motor input shaft 6 but to an end portion of the cylindrical motor input shaft 18 closer to the engine 1 between two end portions. The second drive gear 7 rotates with the cylindrical motor input shaft 18.

In the present embodiment, the second engine input shaft 4 is supported by the cylindrical motor input shaft 18 rotatably, and the cylindrical motor input shaft 18 is supported by the second engine input shaft 4 rotatably. Therefore, the number of bearings, which are separately provided for supporting the input shafts 4, 6, 18, can be reduced as compared to the vehicular power transmission device of the first embodiment. Since the input side clutch 8 is not arranged between the low gear mechanism and the high gear mechanism, the unit consisting of the low gear mechanism and the high gear mechanism can be made compact.

In the present embodiment, the engine 1, the engine input shafts 2, 4, the first drive gear 5, the second drive gear 7, the input side clutch 8, the first motor input shaft 6 and the motor MG1 are arranged on the same axis in this order. With such the arrangement, shaft length of the first motor input shaft 6 can be shortened, so resistance against the torsional vibration increases.

The other construction and the operation of the controller 20 of the present embodiment are the same as those of the first embodiment. Therefore, like the first embodiment, the second engine input shaft 4 that transmits the power from the engine 1 to the first drive gear 5 and the first motor input shaft 6 that transmits the power from the motor MG1 to the second drive gear 7 can be engaged and disengaged by the input side clutch 8. Accordingly, the selection of the combination of the operation modes similar to that of the first embodiment is possible.

Third Embodiment

Figure 14:
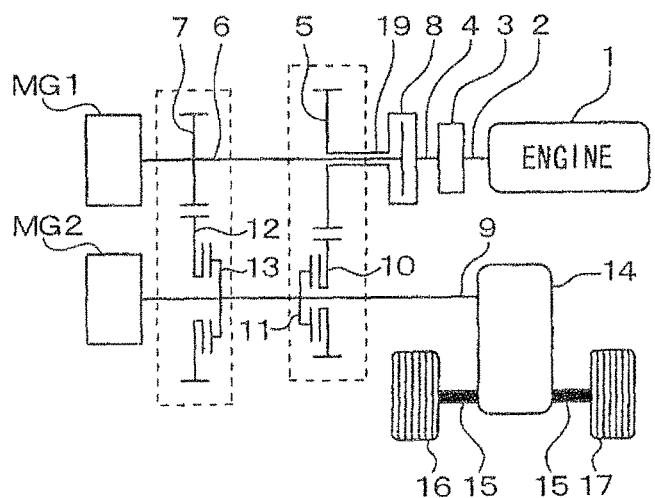
FIG. 14 is a skeleton diagram showing a construction of a vehicular power transmission device according to a third embodiment of the present invention.

Next, a third embodiment of the present invention will be described, focusing on differences from the first embodiment. Differently from the first embodiment, in the vehicular power transmission device according to the present embodiment, the input side clutch 8 that engages and disengages the first motor input shaft 6 and the second engine input shaft 4 is arranged between the engine 1 and the first drive gear 5 as shown in FIG. 14, not between the first drive gear 5 and the second drive gear 7.

In order to realize such the arrangement, a cylindrical engine input shaft 19 is attached to a portion of the input side clutch 8 that rotates with the second engine input shaft 4. The cylindrical engine input shaft 19 coaxially surrounds another portion of the input side clutch 8 that rotates with the first motor input shaft 6. The cylindrical engine input shaft 19 coaxially surrounds the first motor input shaft 6 and extends toward the motor MG1. The cylindrical engine input shaft 19 rotates with the second engine input shaft 4. The first drive gear 5 is fixed not to the second engine input shaft 4 but to an end portion of the cylindrical engine input shaft 19 closer to the motor MG1 between two end portions. The first drive gear 5 rotates with the cylindrical engine input shaft 19.

In the present embodiment, the first motor input shaft 6 is supported by the cylindrical engine input shaft 19 rotatably, and the cylindrical engine input shaft 19 is supported by the first motor input shaft 6 rotatably. Accordingly, the number of bearing members, which are separately provided for supporting the input shafts 4, 6, 19, can be reduced as compared to the vehicular power transmission device of the first embodiment. Since the input side clutch 8 is not arranged between the low gear mechanism and the high gear mechanism, the unit consisting of the low gear mechanism and the high gear mechanism can be made compact.

In the present embodiment, the engine 1, the engine input shafts 2, 4, the input side clutch 8, the first drive gear 5, the second drive gear 7, the first motor input shaft 6 and the motor MG1 are arranged on the same axis in this order. With such the arrangement, shaft length of the engine input shafts 2, 4 can be shortened, so resistance against the torsional vibration increases.

The other construction and the operation of the controller 20 of the present embodiment are the same as those of the first embodiment. Therefore, like the first embodiment, the second engine input shaft 4 that transmits the power from the engine 1 to the first drive gear 5 and the first motor input shaft 6 that transmits the power from the motor MG1 to the second drive gear 7 can be engaged and disengaged by the input side clutch 8. Accordingly, the selection of the combination of the operation modes similar to that of the first embodiment is possible.

Fourth Embodiment

Figures 15, 16:
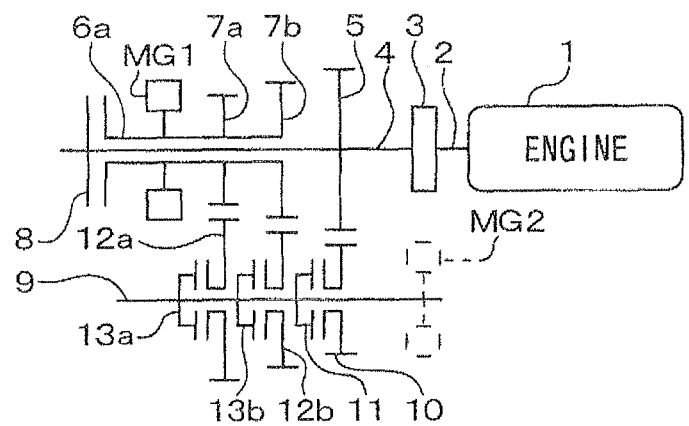
FIG. 15 is a skeleton diagram showing a construction of a vehicular power transmission device according to a fourth embodiment of the present invention.
FIG. 16 is a diagram showing relationships between operation modes and control of clutches according to the fourth embodiment.

Next, a fourth embodiment of the present invention will be described, focusing on differences from the first embodiment. The construction of the vehicular power transmission device according to the present embodiment is shown in FIG. 15 (but controller 20 is not shown). The same components as the first embodiment are denoted with the same referential marks as the first embodiment and will not be explained or will be explained only briefly below.

A major difference of the present embodiment from the first embodiment is that a middle gear mechanism (corresponding to example of second motor side gear mechanism) is also provided in addition to the two stages of the low gear mechanism and the high gear mechanism. A reduction gear ratio of the middle gear mechanism is smaller than that of the low gear mechanism and larger than that of the high gear mechanism.

More specifically, the two stages of the low and middle gear mechanisms are provided on the motor MG1 side of the input side clutch 8 in terms of the power transmission route. Therefore, the engine 1 can use the gear mechanism, which is frequently used by the engine 1 in the hybrid vehicle in general, irrespective of the engagement/disengagement of the input side clutch 8. The motor MG1 can use the first and second motor side gear mechanisms, which are frequently used by the motor MG1 in the hybrid vehicle in general, irrespective of the engagement/disengagement of the input side clutch 8.

More specifically, in the present embodiment, a first motor input shaft 6a that extends from the motor MG1 and that receives the input of the power generated by the motor MG1 is formed as a cylindrical shaft. The first motor input shaft 6a extends from the input side clutch 8 toward the engine 1 and coaxially surrounds the second engine input shaft 4. Therefore, the first motor input shaft 6 is arranged on a side closer to the engine 1 than the input side clutch 8.

The rotor of the motor MG1 is coaxially fixed to the first motor input shaft 6a. Therefore, if the motor MG1 is driven to generate the power and the rotor of the motor MG1 rotates with respect to a stator of the motor MG1, the first motor input shaft 6a also rotates with the rotation of the rotor.

A second drive gear 7a and a third drive gear 7b are pivotally fixed to a portion of the first motor input shaft 6a on a side closer to the engine 1 than the motor MG1. The second drive gear 7a and the third drive gear 7b rotate with the rotation of the first motor input shaft 6a.

The second drive gear 7a meshes with a second driven gear 12a. The second driven gear 12a is supported by the output shaft 9 rotatably. A second output side clutch 13a is fixed to the output shaft 9 and engages and disengages the output shaft 9 and the second driven gear 12a.

The third drive gear 7b meshes with a third driven gear 12b. The third driven gear 12b is supported by the output shaft 9 rotatably. A third output side clutch 13b is fixed to the output shaft 9 and engages and disengages the output shaft 9 and the third driven gear 12b.

The first drive gear 5 is provided between the engine 1 and the second drive gear 7a (and third drive gear 7b). With such the construction, the distance from the engine 1 to the engine side gear mechanism 5, 10, 11 can be shortened. As a result, resistance of the engine input shafts 2, 4 against the torsional vibration can be maintained high.

In the present embodiment, the motor MG2 may be fixed to the output shaft 9 as shown by a broken line in FIG. 15 or the motor MG2 may be removed. In following explanation, it is assumed that the motor MG2 is not provided.

In the vehicular power transmission device having the above-described construction, the first drive gear 5, the first driven gear 10 and the first output side clutch 11 constitute a high gear mechanism like the first embodiment.

If the second output side clutch 13a is engaged, the power transmission is performed between the output shaft 9 and the second driven gear 12a. Therefore, the power transmission is performed between the first motor input shaft 6a and the output shaft 9 through the second drive gear 7a, the second driven gear 12a and the second output side clutch 13a (not through engine input shafts 2, 4). If the second output side clutch 13a is disengaged, the power transmission between the first motor input shaft 6a and the output shaft 9 through the second drive gear 7a, the second driven gear 12a and the second output side clutch 13a is not performed. The second drive gear 7a, the second driven gear 12a and the second output side clutch 13a constitute a low gear mechanism (corresponding to example of first motor side gear mechanism).

If the third output side clutch 13b is engaged, the power transmission is performed between the output shaft 9 and the third driven gear 12b. Therefore, the power transmission is performed between the first motor input shaft 6a and the output shaft 9 through the third drive gear 7b, the third driven gear 12b and the third output side clutch 13b. If the third output side clutch 13b is disengaged, the power transmission between the first motor input shaft 6a and the output shaft 9 through the third drive gear 7b, the third driven gear 12b and the third output side clutch 13b is not performed. The third drive gear 7b, the third driven gear 12b and the third output side clutch 13b constitute a middle gear mechanism (corresponding to example of second motor side gear mechanism).

The reduction gear ratio of the low gear mechanism is larger than that of the middle gear mechanism, and the reduction gear ratio of the middle gear mechanism is larger than that of the high gear mechanism. Therefore, in the vehicular power transmission device, the gear mechanism closest to the engine 1 is the high gear mechanism and the gear mechanism closest to the motor MG1 is the low gear mechanism in terms of both of the power transmission route and the arrangement.

In such the construction, the controller 20 controls the transmission routes and the reduction gear ratios of the powers generated by the engine 1 and the motor MG1 by controlling the driving/non-driving of the motor MG1 and the engagement/disengagement of the input side clutch 8, the first output side clutch 11, the second output side clutch 13a and the third output side clutch 13b based on the various physical quantities, which are obtained within the vehicle and are similar to those of the first embodiment.

By such the control of the clutches 8, 11, 13a, 13b performed by the controller 20, the power generated by the motor MG1 can be transmitted to the driving wheels 16, 17 through any of the low gear mechanism, the middle gear mechanism and the high gear mechanism. Also, the power generated by the engine 1 can be transmitted to the driving wheels 16, 17 through any of the low gear mechanism, the middle gear mechanism and the high gear mechanism.

FIG. 16 shows a correspondence relationship between the control contents of the clutches 8, 11, 13a, 13b by the controller 20 and the gear mechanisms used by the motor MG1 and the engine 1. In FIG. 16, each circle mark means engagement of the clutch, and each blank means disengagement of the clutch.

For example, an ENG(M)+MG1(M) mode as a combination of an ENG(M) mode, in which the engine 1 transmits the power through the middle gear mechanism, and a MG1(M) mode, in which the motor MG1 transmits the power through the middle gear mechanism, is realized by engaging the input side clutch 8 and the third output side clutch 13b and by disengaging the first output side clutch 11 and the second output side clutch 13a respectively. In this way, the same gear mechanism can be commonly used by the engine 1 and the motor MG1.

In addition, for example, an ENG(H)+MG1(M) mode as a combination of an ENG(H) mode, in which the engine 1 transmits the power through the high gear mechanism, and the MG1(M) mode, in which the motor MG1 transmits the power through the middle gear mechanism, is realized by engaging the first output side clutch 11 and the third output side clutch 13b and by disengaging the input side clutch 8 and the second output side clutch 13a respectively. In this way, the different gear mechanisms can be used by the engine 1 and the motor MG1 respectively. However, in this case, because of the structure of the vehicular power transmission device, the gear mechanism used by the engine 1 is limited to the high gear mechanism, and the gear mechanism used by the motor MG1 is limited to the low gear mechanism or the middle gear mechanism.

In addition, for example, an ENG(H) single mode for using only the ENG(H) mode, in which the engine 1 transmits the power through the high gear mechanism, is realized by engaging the first output side clutch 11 and by disengaging the input side clutch 8, the second output side clutch 13a and the third output side clutch 13b respectively.

Figure 17:
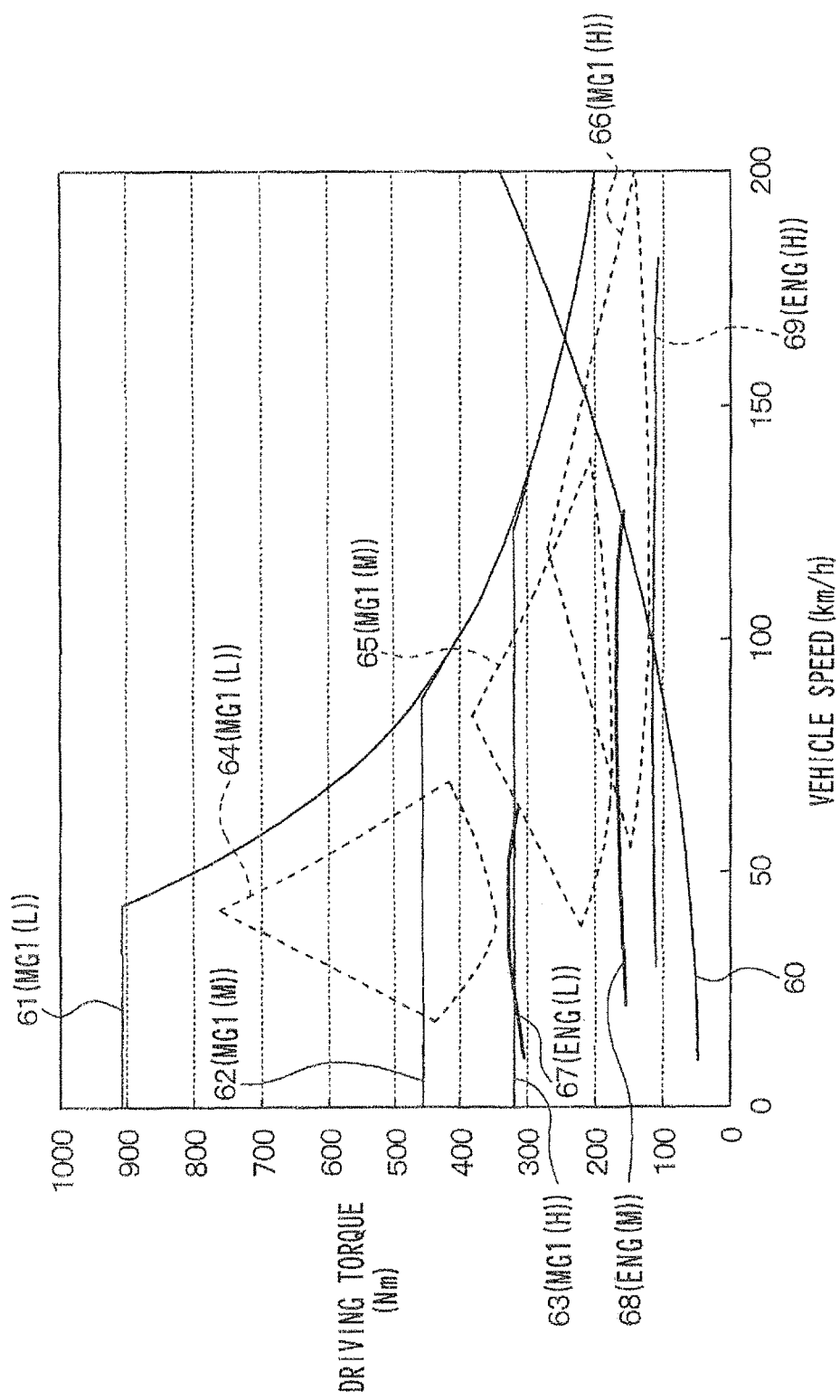
FIG. 17 is a graph showing characteristics of a motor and an engine according to the fourth embodiment.

An example of characteristics of the motor MG1 and the engine 1 is shown in FIG. 17 in the same manner as FIG. 8. A solid line 60 in FIG. 17 shows necessary driving torque at respective vehicle speeds during flat-area constant-speed running. Solid lines 61, 62, 63 respectively show upper limits of the driving torque, which can be generated by the motor MG 1 at respective vehicle speeds in the MG1(L) mode, the MG1(M) mode and the MG1(H) mode respectively.

Areas 64, 65, 66 surrounded by broken lines show areas where efficiency (equivalent to gas mileage) is assumed to be equal to or higher than a predetermined reference in the MG1(L) mode, the MG1(M) mode and the MG1(H) mode respectively. Solid lines 67, 68, 69 show ranges (maximum efficiency lines) in which the efficiency is assumed to be the maximum in the ENG(L) mode, the ENG(M) mode and the ENG(H) mode respectively.

Also in the present embodiment, in order to realize the running suitable for the state of the vehicle, the operation modes of the motor MG1 and the engine 1 are selected in consideration of the above-described characteristics of the motor MG1 and the engine 1.

The basic concept of the selection of the operation modes of the motor MG1 and the engine 1 is that the most efficient combination is selected in the relationship between the vehicle speed and the necessary driving torque. More specifically, the controller 20 switches the running mode between the EV main mode and the engine main mode based on the SOC by a method similar to the method of the first embodiment. The controller 20 selects a combination of the operation modes of the motor MG1 and the engine 1 corresponding to the necessary driving torque and the obtained vehicle speed in each of the EV main mode and the engine main mode respectively by using the corresponding switching map.

Figure 18:
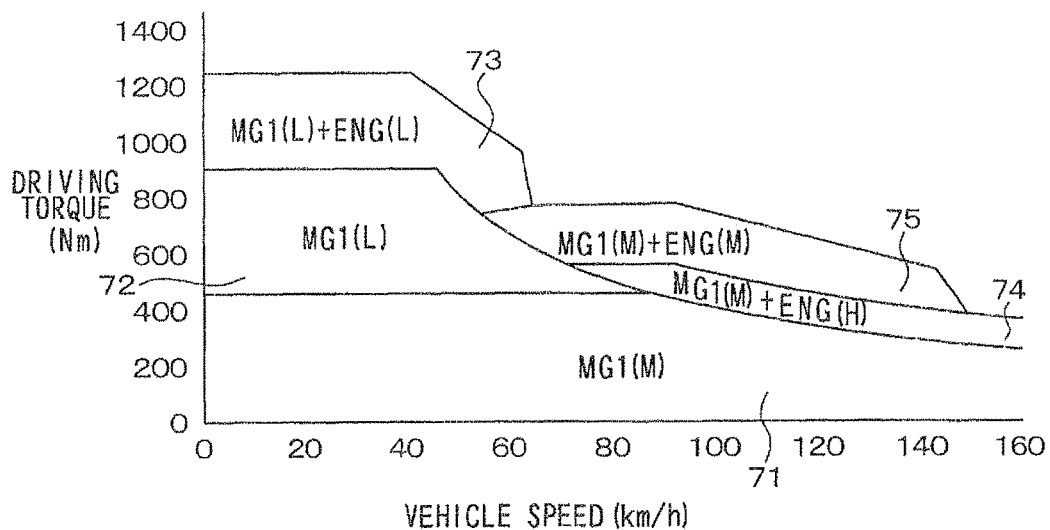
FIG. 18 is a diagram showing a switching map in an EV main mode according to the fourth embodiment.
Figure 19:
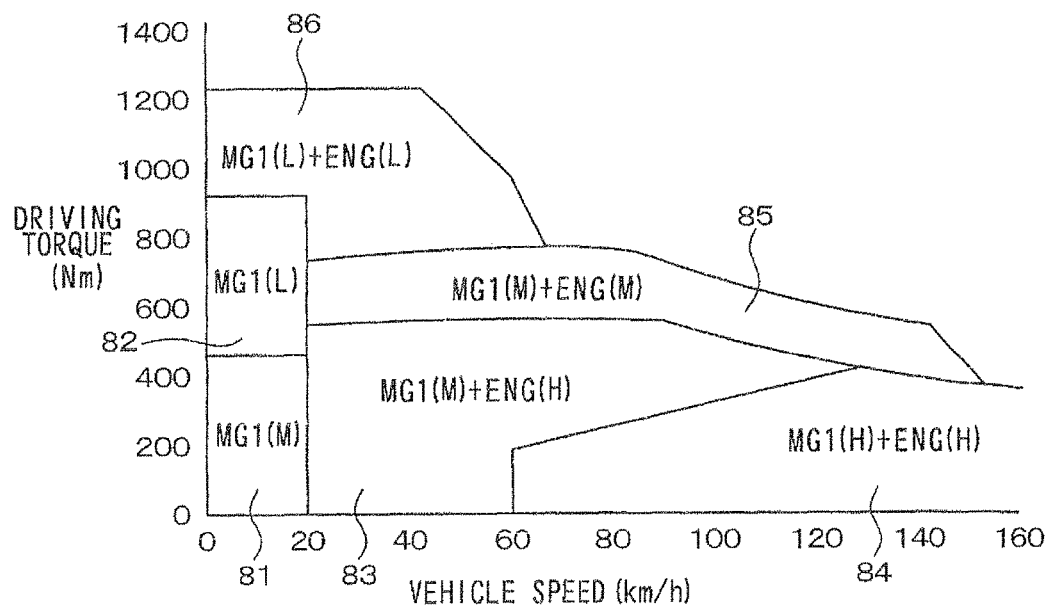
FIG. 19 is a diagram showing a switching map in an engine main mode according to the fourth embodiment.

In the present embodiment, a switching map shown in FIG. 18 is used as the switching map for the EV main mode, and a switching map shown in FIG. 19 is used as the switching map for the engine main mode.

Next, concrete contents of partitioning and allotting of the switching maps of FIGS. 18 and 19 will be explained. On the switching map for the EV main mode of FIG. 18, a range of the driving torque equal to or lower than approximately 400 Nm defines a single block 71 across the entire vehicle speed range. A combination of the MG1(M) mode and the non-driving mode of the engine 1 is allotted to the block 71. It is because the area 65 of the high efficiency in the MG1(M) mode exists in the center of the block 71. This combination is realized by disengaging the input side clutch 8, the first output side clutch 11 and the second output side clutch 13a and by engaging the third output side clutch 13b respectively.

A block 72 covering a driving torque range immediately above the block 71 is defined in a range from start to low-speed or middle-speed acceleration ranging from 0 km/h to approximately 70 km/h. A combination of the MG1(L) mode and the non-driving mode of the engine 1 is allotted to the block 72. It is because the area 64 of the high efficiency in the MG1(L) mode exists in the center of the block 72. This combination is realized by disengaging the input side clutch 8, the first output side clutch 11 and the third output side clutch 13b and by engaging the second output side clutch 13a respectively.

A block 73 covering a driving torque range immediately above the block 72 is defined in a range from start to low-speed or middle-speed acceleration ranging from 0 km/h to approximately 70 km/h. A combination of the MG1(L) mode and the ENG(L) mode is allotted to the block 73. By using the motor MG1 and the engine 1 together in this way, while the power generated by the motor MG1 is the driving torque in or near the high efficiency area 64 of the MG1(L) mode of FIG. 17 and while the power generated by the engine 1 is the driving torque in or near the high efficiency range 67 of the ENG(L) mode of FIG. 17, the driving torque of the axle 15 larger than the high efficiency area 64 or range 67 can be realized. This combination is realized by disengaging the first output side clutch 11 and the third output side clutch 13b and by engaging the input side clutch 8 and the second output side clutch 13a respectively.

A block 74 covering a driving torque range immediately above the block 71 is defined in a high-speed range over 70 km/h. A combination of the MG1(M) mode and the ENG(H) mode is allotted to the block 74. By using the motor MG1 and the engine 1 together in this way, while the power generated by the motor MG1 is the driving torque in or near the high efficiency area 65 of the MG1(M) mode of FIG. 17 and while the power generated by the engine 1 is the driving torque in or near the high efficiency range 69 of the ENG(H) mode of FIG. 17, the driving torque of the axle 15 larger than the high efficiency area 65 or range 69 can be realized. This combination is realized by disengaging the input side clutch 8 and the second output side clutch 13a and by engaging the first output side clutch 11 and the third output side clutch 13b respectively.

A block 75 covering a driving torque range immediately above the block 74 is defined in a high-speed range over 60 km/h. A combination of the MG1(M) mode and the ENG(M) is allotted to the block 75. By using the motor MG1 and the engine 1 together in this way, while the power generated by the motor MG1 is the driving torque in or near the high efficiency area 65 of the MG1(M) mode of FIG. 17 and while the power generated by the engine 1 is the driving torque in or near the high efficiency range 68 of the ENG(M) mode of FIG. 17, the driving torque of the axle 15 larger than the high efficiency area 65 or range 68 can be realized. Higher driving torque can be realized since the value of the driving torque is higher in the high efficiency range 68 of the ENG(M) mode than in the high efficiency range 69 of the ENG(H) mode. This combination is realized by disengaging the first output side clutch 11 and the second output side clutch 13a and by engaging the input side clutch 8 and the third output side clutch 13b respectively.

In the EV main mode, the input side clutch 8 is engaged only in the blocks 73, 75, in which the engine 1 and the motor MG1 use the same gear mechanism. Therefore, the input side clutch 8 does not operate unless the necessary driving torque becomes very large. Therefore, wear of the input side clutch 8 and the friction plates of the input side clutch 8 can be reduced significantly. At the same time, the driving energy of the actuator can be reduced significantly.

On the switching map for the engine main mode of FIG. 19, in a range of very low vehicle speed ranging from 0 km/h to 20 km/h, a MG1(M) single mode for driving the vehicle only in the MG1(M) mode is allotted to a block 81 where the necessary driving torque is equal to or lower than approximately 400 Nm. In this way, also in the engine main mode mainly using the engine 1, the vehicle is driven only with the motor MG1 in the very low speed range where the electric power consumption is not very large. This combination is realized by disengaging the input side clutch 8, the first output side clutch 11 and the second output side clutch 13a and by engaging the third output side clutch 13b respectively.

A block 82 covering a driving torque range immediately above the block 81 is defined in the very low speed range. A MG1(L) single mode for driving the vehicle only in the MG1(L) mode is allotted to the block 82. In this way, also in the engine main mode mainly using the engine 1, the vehicle is driven only with the motor MG1 in the very low speed range where the electric power consumption is not very large. The driving torque is larger than in the block 81. Therefore, instead of the MG1(M) mode, the MG1(L) mode having the high efficiency area 64 in the high driving torque range is used. This combination is realized by disengaging the input side clutch 8, the first output side clutch 11 and the third output side clutch 13b and by engaging the second output side clutch 13a respectively.

A combination of the MG1(M) mode and the ENG(H) mode is allotted to a block 83 having the high efficiency area 65 of the MG1(M) mode in its center. A combination of the MG1(H) mode and the ENG(H) mode is allotted to a block 84 having the high efficiency area 66 of the MG1(H) mode in its center. This combination allotted to the block 84 is realized by disengaging the second output side clutch 13a and the third output side clutch 13b and by engaging the input side clutch 8 and the first output side clutch 11 respectively.

A block 85 covering a driving torque range immediately above the blocks 83, 84 is defined in a middle to high speed range ranging from approximately 20 km/h to approximately 150 km/h. A combination of the MG1(M) mode and the ENG(M) is allotted to the block 85. By using the motor MG1 and the engine 1 together in this way, while the power generated by the motor MG1 is the driving torque in or near the high efficiency area 65 of the MG1(M) mode of FIG. 17 and while the power generated by the engine 1 is the driving torque in or near the high efficiency range 68 of the ENG(M) mode of FIG. 17, the driving torque of the axle 15 larger than the high efficiency area 65 or range 68 can be realized.

A block 86 covering a driving torque range immediately above the blocks 82, 85 is defined in a middle speed range ranging from approximately 20 km/h to approximately 60 km/h. A combination of the MG1(L) mode and the ENG(L) mode is allotted to the block 86. By using the motor MG1 and the engine 1 together in this way, while the power generated by the motor MG1 is the driving torque in or near the high efficiency area 64 of the MG1(L) mode of FIG. 17 and while the power generated by the engine 1 is the driving torque in or near the high efficiency range 67 of the ENG(L) mode of FIG. 17, the driving torque of the axle 15 larger than the high efficiency area 64 or range 67 can be realized.

In the engine main mode, the input side clutch 8 is engaged only in the blocks 84, 85, 86, in which the engine 1 and the motor MG1 use the same gear mechanism. Therefore, the input side clutch 8 does not operate unless the necessary driving torque becomes very large or the vehicle speed becomes very high. Therefore, wear of the input side clutch 8 and the friction plates of the input side clutch 8 can be reduced significantly. At the same time, the driving energy of the actuator can be reduced significantly.

As explained above, the controller 20 selectively uses the EV main mode for mainly using the motor MG1 or the engine main mode for mainly using the engine 1 according to the SOC of the vehicle driving battery. The controller 20 selects the efficient combination of the driving/non-driving and the reduction gear ratios of the motor MG1 and the engine 1 in each of the EV main mode and the engine main mode respectively according to the necessary driving torque and the vehicle speed. In order to realize the selected combination, the controller 20 controls the engagement/disengagement of the input side clutch 8, the first output side clutch 11, the second output side clutch 13a and the third output side clutch 13b and the driving/non-driving of the motor MG1.

As shown in the switching maps of FIGS. 18 and 19, in the area (defined by vehicle speed from 0 to 60 km/h and driving torque from 0 to 300 Nm) realized in the normal running, the ENG (H) mode is used more often than the ENG (L) mode and the MG1(M) mode and the MG1(L) mode are used more often than the MG1(H) mode.

In this way, also when the multi-stages of gear mechanisms of three or more stages are used, effects similar to the first embodiment can be obtained.

Fifth Embodiment

Figure 20:
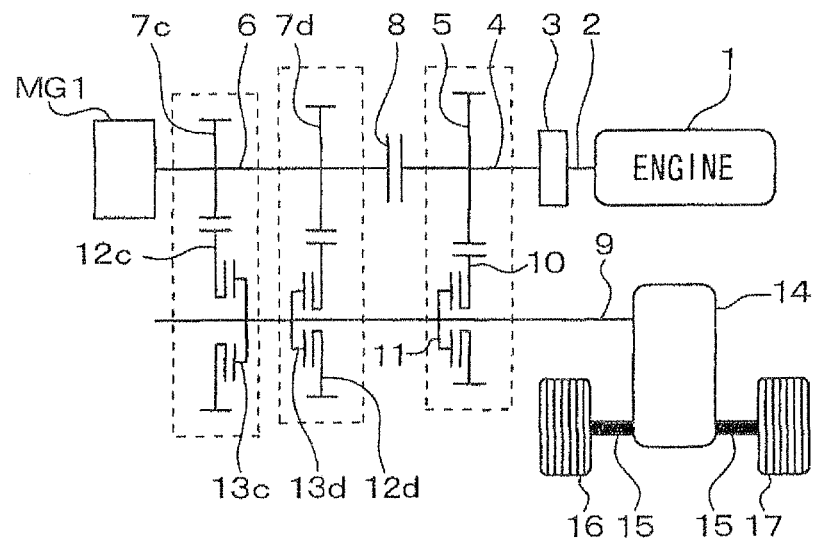
FIG. 20 is a skeleton diagram showing a construction of a vehicular power transmission device according to a fifth embodiment of the present invention.

Next, a fifth embodiment of the present invention will be described, focusing on differences from the first embodiment. The construction of the vehicular power transmission device according to the present embodiment is shown in FIG. 20 (but controller 20 is not shown). The same components as the first embodiment are denoted with the same referential marks as the first embodiment and will not be explained or will be explained only briefly below.

A major difference of the present embodiment from the first embodiment is that a middle gear mechanism is also provided in addition to the two stages of the low gear mechanism and the high gear mechanism like the fourth embodiment. The two stages of the low gear mechanism and the middle gear mechanism are provided on the motor MG1 side of the input side clutch 8 in terms of both of the power transmission route and the arrangement.

More specifically, a second drive gear 7c and a third drive gear 7d are pivotally fixed to the first motor input shaft 6 such that the second drive gear 7c and the third drive gear 7d rotate with the rotation of the first motor input shaft 6.

The second drive gear 7c meshes with a second driven gear 12c, which is supported by the output shaft 9 rotatably. A second output side clutch 13c is fixed to the output shaft 9 and engages and disengages the output shaft 9 and the second driven gear 12c.

A third drive gear 7d meshes with a third driven gear 12d, which is supported by the output shaft 9 rotatably. A third output side clutch 13d is fixed to the output shaft 9 and engages and disengages the output shaft 9 and the third driven gear 12d. The motor MG2 is not provided in the present embodiment.

The operation of the controller 20 in the vehicular power transmission device having the above-described construction is the same as the fourth embodiment.

In this way, also when the multi-stages of gear mechanisms of three or more stages are used, effects similar to the first embodiment can be obtained.

Sixth Embodiment

Figure 21:
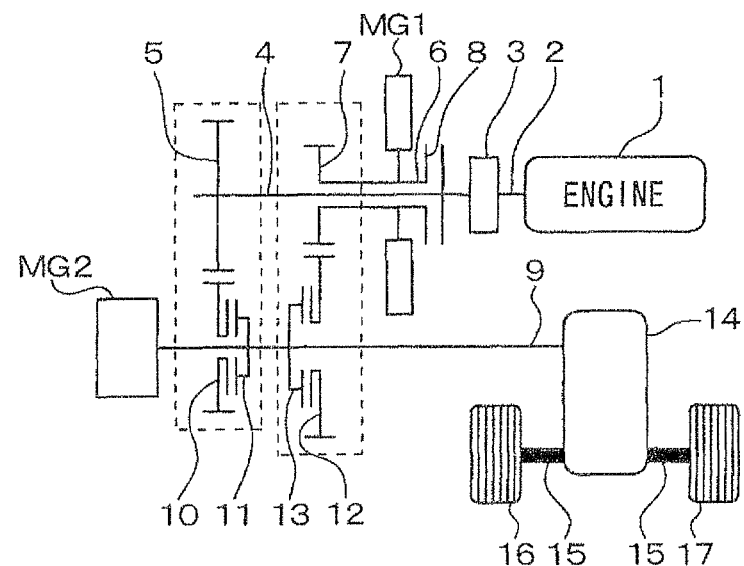
FIG. 21 is a skeleton diagram showing a construction of a vehicular power transmission device according to a sixth embodiment of the present invention.

Next, a sixth embodiment of the present invention will be described, focusing on differences from the first embodiment. As shown in FIG. 21, in the vehicular power transmission device according to the present embodiment, the motor MG1 and the second drive gear 7 (constituting low gear mechanism) are arranged between the first drive gear 5 (constituting high gear mechanism) and the engine 1 differently from the first embodiment.

More specifically, the input side clutch 8 is attached between the damper 3 and the first drive gear 5 on the second engine input shaft 4. The first motor input shaft 6, which is formed in a cylindrical shape differently from the first embodiment, is fixed to the input side clutch 8. A function of the input side clutch 8 to engage and disengage the second engine input shaft 4 and the first motor input shaft 6 is the same as the first embodiment.

The first motor input shaft 6 coaxially surrounds the second engine input shaft 4 and extends from the input side clutch 8 toward the first drive gear 5. The motor MG1 and the second drive gear 7 are fixed to the first motor input shaft 6 in this order from a side closer to the input side clutch 8.

Therefore, the input side clutch 8 is arranged between the motor MG1 and the engine 1.

Also the second driven gear 12 and the second output side clutch 13 are arranged on the differential gear 14 side of the first driven gear 10 and the first output side clutch 11 in conformity with the arrangement of the second drive gear 7. Therefore, differently from the first embodiment, the high gear mechanism 5, 10, 11 is arranged on a farther side of the low gear mechanism 7, 12, 13 from the engine 1.

In this way, the motor MG1 is positioned closer to the engine 1 than the first drive gear 5 (high gear mechanism) and the second drive gear 7 (low gear mechanism) are. Therefore, the motor MG1 can be arranged in a place where a clutch, a torque converter and the like have been placed in a conventional vehicle. Thus, the space can be used effectively. By extending the distance between the motors MG1, MG2, a degree of freedom of an installation dimension of the motor MG2 can be increased while avoiding interference with the motor MG1.

The other construction and the operation of the controller 20 of the present embodiment are the same as those of the first embodiment. Accordingly, selection of the combination of the operation modes similar to that of the first embodiment is possible. The same component is denoted with the same sign between FIG. 1 and FIG. 21.

Seventh Embodiment

Figure 22:
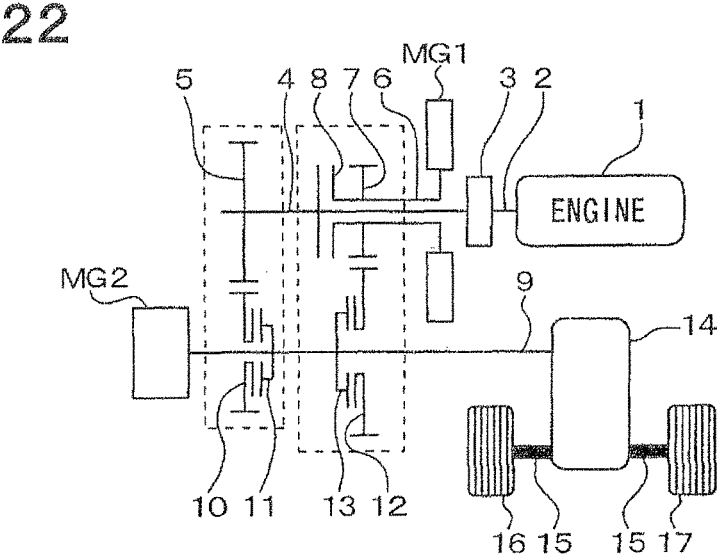
FIG. 22 is a skeleton diagram showing a construction of a vehicular power transmission device according to a seventh embodiment of the present invention.

Next, a seventh embodiment of the present invention will be described, focusing on differences from the first embodiment. As shown in FIG. 22, in the vehicular power transmission device according to the present embodiment, the motor MG1 and the second drive gear 7 (constituting low gear mechanism) are arranged between the first drive gear 5 (constituting high gear mechanism) and the engine 1 differently from the first embodiment.

More specifically, the input side clutch 8 is attached between the damper 3 and the first drive gear 5 on the second engine input shaft 4. The first motor input shaft 6, which is formed in a cylindrical shape differently from the first embodiment, is fixed to the input side clutch 8. A function of the input side clutch 8 to engage and disengage the second engine input shaft 4 and the first motor input shaft 6 is the same as the first embodiment.

The first motor input shaft 6 coaxially surrounds the second engine input shaft 4 and extends from the input side clutch 8 toward the engine 1. The second drive gear 7 and the motor MG1 are fixed to the first motor input shaft 6 in this order from a side closer to the input side clutch 8. Therefore, the input side clutch 8 is arranged between the first drive gear 5 (high gear mechanism) and the second drive gear 7 (low gear mechanism).

Also the second driven gear 12 and the second output side clutch 13 are arranged on the differential gear 14 side of the first driven gear 10 and the first output side clutch 11 in conformity with the arrangement of the second drive gear 7. Therefore, the high gear mechanism 5, 10, 11 is arranged on a farther side of the low gear mechanism 7, 12, 13 from the engine 1 differently from the first embodiment.

In this way, the motor MG1 is arranged closer to the engine 1 than the first drive gear 5 (high gear mechanism) and the second drive gear 7 (low gear mechanism) are. Therefore, the motor MG1 can be arranged in a place where a clutch, a torque converter and the like have been placed in a conventional vehicle. Thus, the space can be used effectively. By extending the distance between the motors MG1, MG2, a degree of freedom of an installation dimension of the motor MG2 can be increased while avoiding interference with the motor MG1.

The other construction and the operation of the controller 20 of the present embodiment are the same as those of the first embodiment. Accordingly, selection of the combination of the operation modes similar to that of the first embodiment is possible. The same component is denoted with the same sign between FIG. 1 and FIG. 22.

Eighth Embodiment

Figure 23:
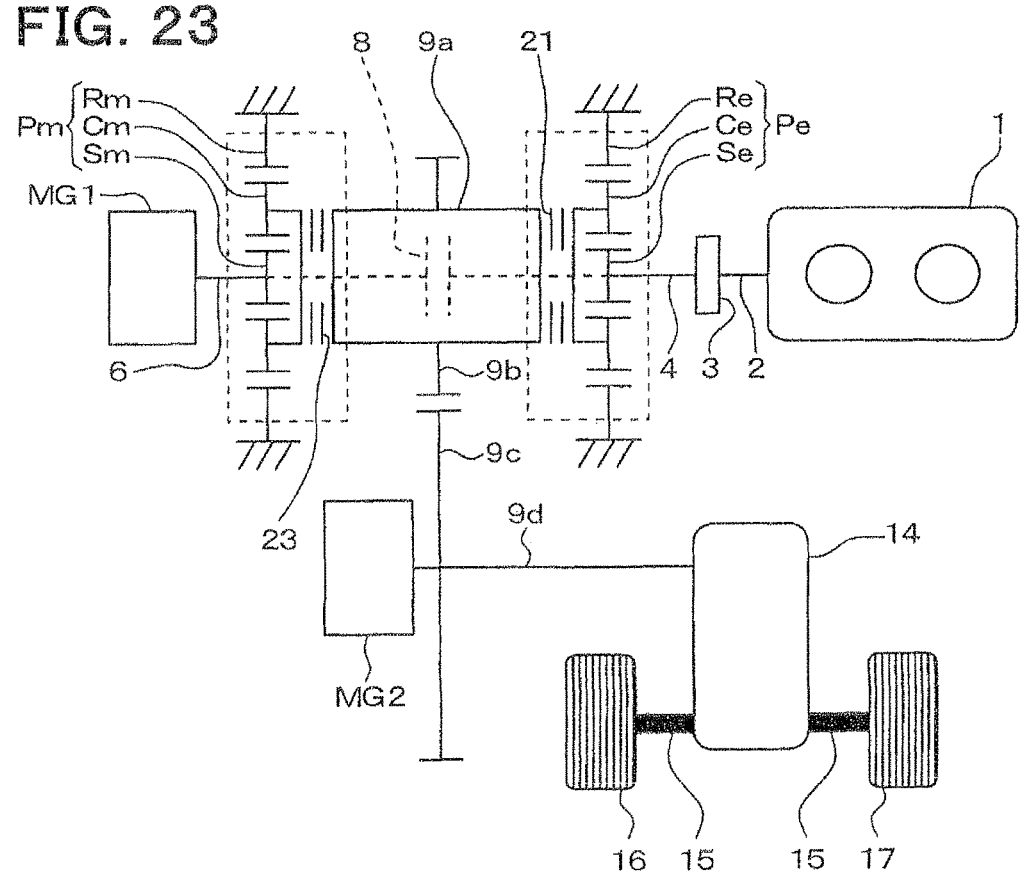
FIG. 23 is a skeleton diagram showing a construction of a vehicular power transmission device according to an eighth embodiment of the present invention.

Next, an eighth embodiment of the present invention will be described, focusing on differences from the first embodiment. The construction of the vehicular power transmission device according to the present embodiment is shown in FIG. 23 (but controller 20 is not shown). The same components as the first embodiment are denoted with the same referential marks as the first embodiment and will not be explained or will be explained only briefly below.

Differences of the present embodiment from the first embodiment are constructions of a high gear mechanism (corresponding to example of engine side gear mechanism), a low gear mechanism (corresponding to example of first motor side gear mechanism) and an output shaft.

First, the high gear mechanism will be explained concretely. The high gear mechanism of the first embodiment (refer to FIG. 1) consists of the first drive gear 5, the first driven gear 10, and the first output side clutch 11. The high gear mechanism of the present embodiment consists of an engine side planetary gear mechanism Pe and a clutch 21.

In the engine side planetary gear mechanism Pe, a sun gear Se is connected to the first engine input shaft 2, and a ring gear Re is fixed (to body of vehicle, for example). The clutch 21 engages and disengages a carrier Ce of the engine side planetary gear mechanism Pe and an end (engine 1 side end) of a first output shaft 9a in accordance with control by the controller 20.

With such the construction, the power transmitted to the first engine input shaft 2 (from engine 1 or input side clutch 8) is transmitted from the sun gear Se to the carrier Ce at a reduction gear ratio corresponding to the construction of the engine side planetary gear mechanism Pe. If the clutch 21 is engaged at that time, the power is further transmitted from the carrier Ce to the first output shaft 9a.

Next, the low gear mechanism will be explained concretely. The low gear mechanism of the first embodiment (refer to FIG. 1) consists of the second drive gear 7, the second driven gear 12, and the second output side clutch 13. The low gear mechanism of the present embodiment consists of a motor side planetary gear mechanism Pm and a clutch 23.

In the motor side planetary gear mechanism Pm, a sun gear Sm is connected to the first motor input shaft 6, and a ring gear Rm is fixed (to body of vehicle, for example). The clutch 23 engages and disengages a carrier Cm of the motor side planetary gear mechanism Pm and the other end (motor MG1 side end) of the first output shaft 9a in accordance with the control by the controller 20.

With such the construction, the power transmitted to the first motor input shaft 6 (from motor MG1 or input side clutch 8) is transmitted from the sun gear Sm to the carrier Cm at a reduction gear ratio corresponding to the construction of the motor side planetary gear mechanism Pm, which is larger than the reduction gear ratio corresponding to the construction of the engine side planetary gear mechanism Pe. If the clutch 23 is engaged at that time, the power is further transmitted from the carrier Cm to the first output shaft 9a.

In the present embodiment, both of the reduction gear ratios of the high gear mechanism and the low gear mechanism are larger than 1. The reduction gear ratio of the low gear mechanism is larger than the reduction gear ratio of the high gear mechanism.

Next, the output shaft will be explained concretely. In the present embodiment, the first output shaft 9a, a gear 9b, a gear 9c and a second output shaft 9d are provided in place of the output shaft 9 of the first embodiment (refer to FIG. 1).

The first output shaft 9a is a cylindrical power transmission shaft surrounding the first engine input shaft 2, the first motor input shaft 6 and the input side clutch 8. The first output shaft 9a is arranged coaxially with the first engine input shaft 2 and the first motor input shaft 6.

The power generated by the motor MG2 is inputted to the second output shaft 9d extending from the motor MG2. The second output shaft 9d is arranged to be parallel and lateral to the first engine input shaft 2, the first motor input shaft 6 and the first output shaft 9a. The second output shaft 9d outputs the power to be transmitted to the differential gear 14, the axle 15 and the like.

The gear 9b is fixed to the first output shaft 9a and rotates with the first output shaft 9a. The gear 9c is fixed to the second output shaft 9d and rotates with the second output shaft 9d. The gears 9b, 9c mesh with each other and rotate together at a rotation number ratio corresponding to a ratio between their teeth.

Also by using such the construction, when the input side clutch 8 is engaged, the power can be transmitted between the high gear mechanism Pe, 11 on the first engine input shaft 2 and the low gear mechanism Pm, 13 on the first motor input shaft 6 like the first embodiment. When the input side clutch 8 is disengaged, the power of the first engine input shaft 2 and the power of the first motor input shaft 6 can be transmitted to the first output shaft 9a, the gear 9b, the gear 9c and the second output shaft 9d at the different reduction gear ratios at the same time.

The operation of the controller 20 of the present embodiment is the same as the first embodiment. However, the same control as the engagement/disengagement control of the first output side clutch 11 is applied to the clutch 21 in place of the first output side clutch 11. The same control as the engagement/disengagement control of the second output side clutch 13 is applied to the clutch 23 in place of the second output side clutch 13.

Ninth Embodiment

Figure 24:
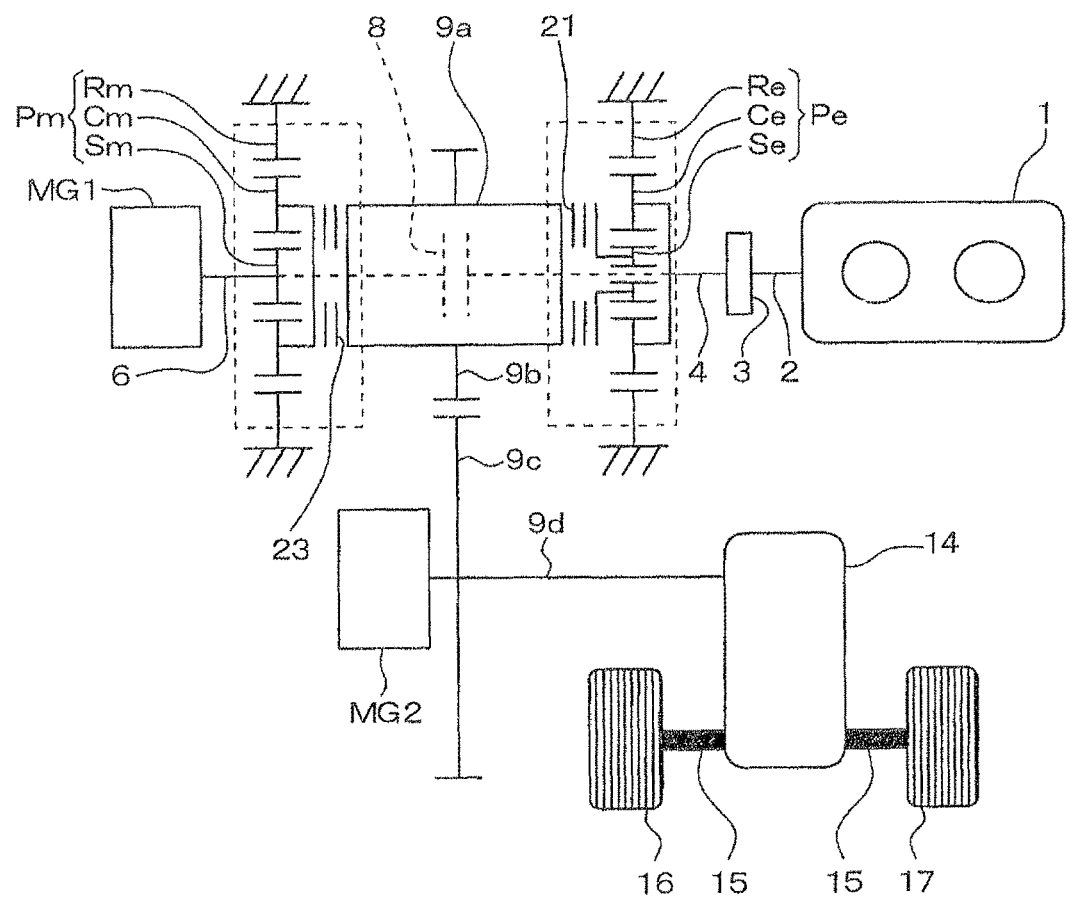
FIG. 24 is a skeleton diagram showing a construction of a vehicular power transmission device according to a ninth embodiment of the present invention.

Next, a ninth embodiment of the present invention will be described, focusing on differences from the eighth embodiment. The construction of the vehicular power transmission device according to the present embodiment is shown in FIG. 24 (but controller 20 is not shown). The same components as the first embodiment are denoted with the same referential marks as the first embodiment and will not be explained or will be explained only briefly below.

The operation of the controller 20 of the present embodiment is the same as the eighth embodiment. A difference of the construction of the vehicular power transmission device of the present embodiment from the first embodiment is a construction of a high gear mechanism (engine side planetary gear mechanism Pe and clutch 21).

More specifically, in the engine side planetary gear mechanism Pe, a carrier Ce is connected to the first engine input shaft 2, and a ring gear Re is fixed (to body of vehicle, for example). The clutch 21 engages and disengages a sun gear Se of the engine side planetary gear mechanism Pe and an end (engine 1 side end) of the first output shaft 9a in accordance with the control by the controller 20.

With such the construction, the power transmitted to the first engine input shaft 2 (from engine 1 or input side clutch 8) is transmitted from the carrier Ce to the sun gear Se at a reduction gear ratio corresponding to the construction of the engine side planetary gear mechanism Pe. If the clutch 21 is engaged at that time, the power is further transmitted from the sun gear Se to the first output shaft 9a.

Also when such the construction is used, an effect similar to the eighth embodiment can be obtained. According to the present embodiment, the connection relationship between the sun gear Se and the carrier Ce is reversed from the eighth embodiment. Thus, an overdrive at the reduction gear ratio of the high gear mechanism smaller than 1 can be realized.

Tenth Embodiment

Figure 25:
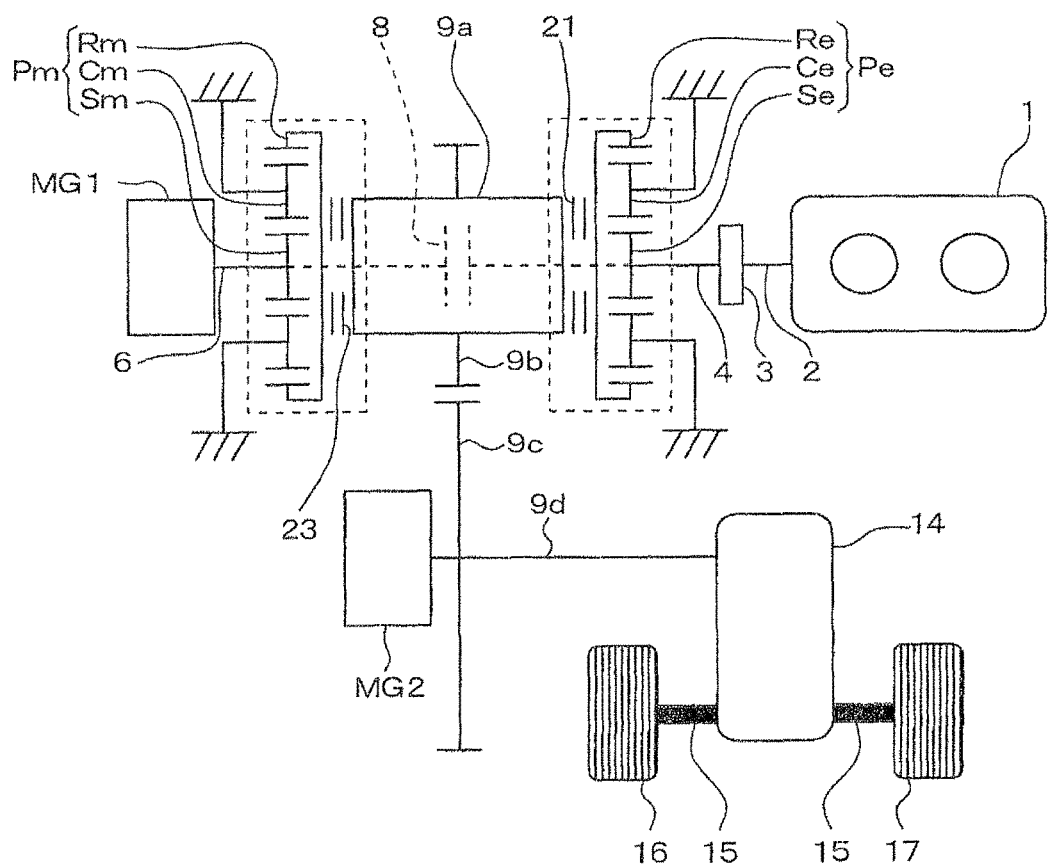
FIG. 25 is a skeleton diagram showing a construction of a vehicular power transmission device according to a tenth embodiment of the present invention.

Next, a tenth embodiment of the present invention will be described, focusing on differences from the eighth embodiment. The construction of the vehicular power transmission device according to the present embodiment is shown in FIG. 25 (but controller 20 is not shown). The same components as the first embodiment are denoted with the same referential marks as the first embodiment and will not be explained or will be explained only briefly below.

The operation of the controller 20 of the present embodiment is the same as the eighth embodiment. Major differences of the construction of the vehicular power transmission device of the present embodiment from the first embodiment are constructions of a high gear mechanism (engine side planetary gear mechanism Pe and clutch 21) and a low gear mechanism (motor side planetary gear mechanism Pm and clutch 23).

First, the high gear mechanism will be explained concretely. In the engine side planetary gear mechanism Pe, a sun gear Se is connected to the first engine input shaft 2, and a carrier Ce is fixed (to body of vehicle, for example). The clutch 21 engages and disengages the ring gear Re of the engine side planetary gear mechanism Pe and an end (engine 1 side end) of the first output shaft 9a in accordance with the control by the controller 20.

With such the construction, the power transmitted to the first engine input shaft 2 (from engine 1 or input side clutch 8) is transmitted from the sun gear Se to the ring gear Re at a reduction gear ratio corresponding to the construction of the engine side planetary gear mechanism Pe. If the clutch 21 is engaged at that time, the power is further transmitted from the ring gear Re to the first output shaft 9a.

Next, the low gear mechanism will be explained concretely. In the motor side planetary gear mechanism Pm, a sun gear Sm is connected to the first motor input shaft 6, and a carrier Cm is fixed (to body of vehicle, for example). The clutch 23 engages and disengages the ring gear Rm of the motor side planetary gear mechanism Pm and the other end (motor MG1 side end) of the first output shaft 9a in accordance with the control by the controller 20.

With such the construction, the power transmitted to the first motor input shaft 6 (from motor MG1 or input side clutch 8) is transmitted from the sun gear Sm to the ring gear Rm at a reduction gear ratio corresponding to the construction of the motor side planetary gear mechanism Pm, which is larger than the reduction gear ratio corresponding to the construction of the engine side planetary gear mechanism Pe. If the clutch 23 is engaged at that time, the power is further transmitted from the ring gear Rm to the first output shaft 9a.

Also by using such the construction, when the input side clutch 8 is engaged, the power can be transmitted between the high gear mechanism Pe, 11 on the first engine input shaft 2 and the low gear mechanism Pm, 13 on the first motor input shaft 6 like the eighth embodiment. When the input side clutch 8 is disengaged, the power of the first engine input shaft 2 and the power of the first motor input shaft 6 can be transmitted to the first output shaft 9a, the gear 9b, the gear 9c and the second output shaft 9d at the different reduction gear ratios at the same time.

Eleventh Embodiment

Figure 26:
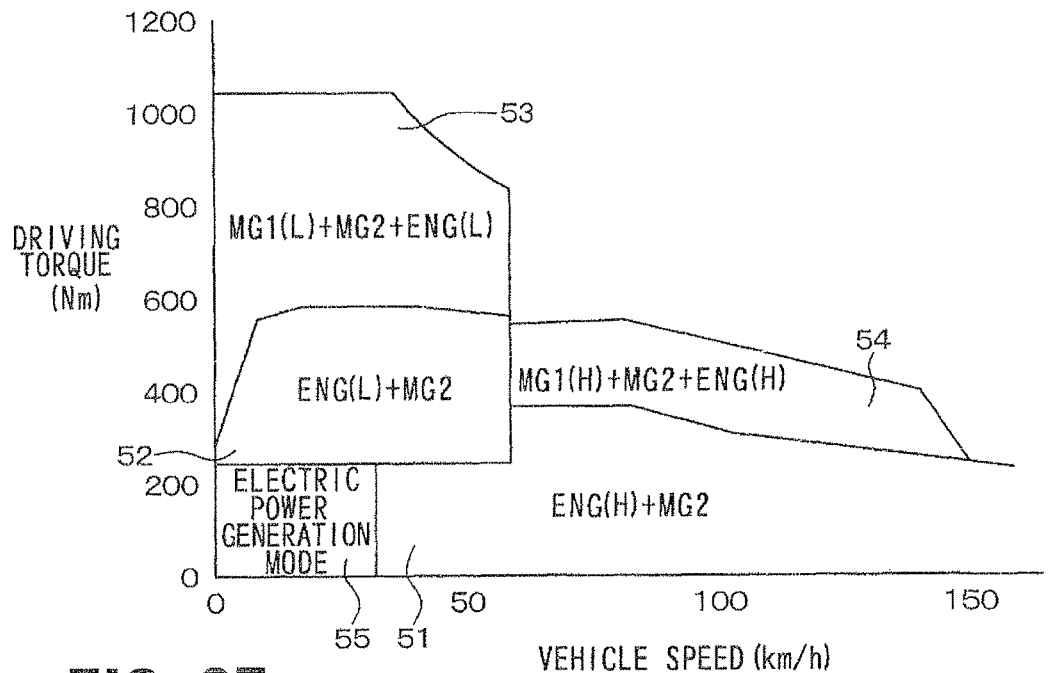
FIG. 26 is a diagram showing a switching map in an engine main mode according to an eleventh embodiment of the present invention.

Next, an eleventh embodiment of the present invention will be described. A difference of the present embodiment from the first embodiment is only that a switching map shown in FIG. 26 is used as a switching map of the engine main mode in place of the switching map shown in FIG. 10. The switching map of FIG. 26 is different from the switching map of FIG. 10 in that the blocks 51, 52 of FIG. 10 are partly replaced with a block 55 for performing an electric power generation mode. The replaced part in the block 51 of FIG. 10 is the area 55 of the lowest speed (range of vehicle speed from 0 km/h to approximately 30 km/h in present embodiment) and the lowest load (range of driving torque from 0 Nm to approximately 200 Nm in present embodiment).

Thus, in the area of the low speed and the low load, the electric power is generated in the motor MG1 by using the power generated in the engine 1. Thus, the vehicle driving battery can be charged not through the gear mechanisms (5, 7, 7a, 7c, 10, 11, 12, 12a, 12c, 13, 13a, 13c), so efficiency improves and the fall of the SOC can be suppressed.

Twelfth Embodiment

Figure 27:
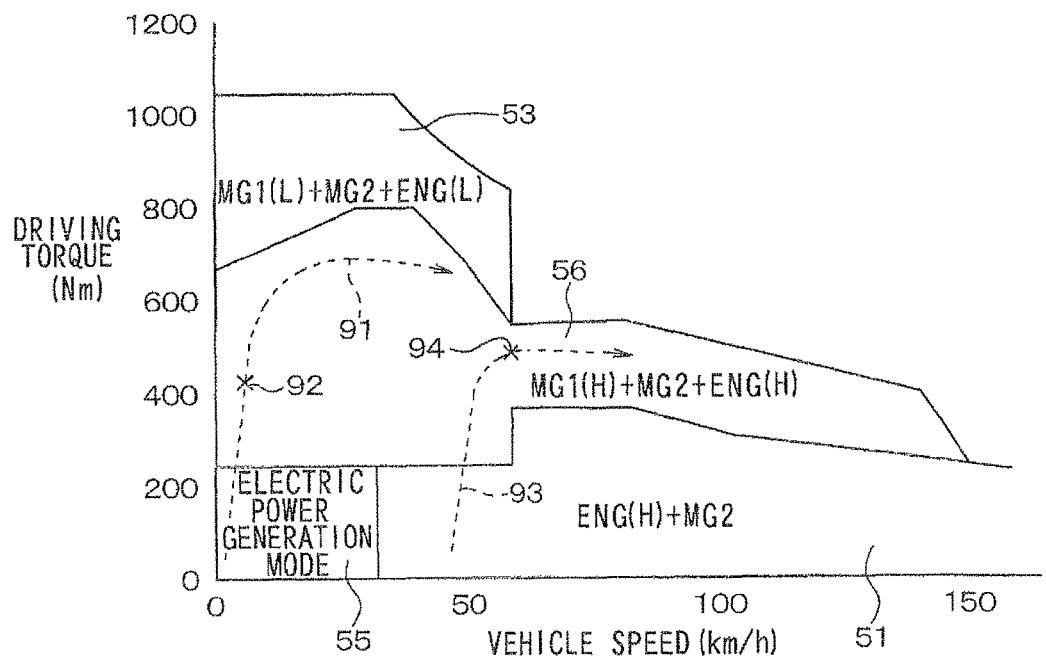
FIG. 27 is a diagram showing a switching map in an engine main mode according to a twelfth embodiment of the present invention.

Next, a twelfth embodiment of the present invention will be described. A difference of the present embodiment from the eleventh embodiment is only that a switching map shown in FIG. 27 is used as a switching map of the engine main mode in place of the switching map shown in FIG. 26. A difference of the switching map of FIG. 27 from the switching map of FIG. 26 is that the block 54, to which the combination of the MG1(H) mode, the driving mode of the motor MG2 and the ENG(H) mode is allotted, is expanded to the entire block 52 and a part of the block 53 where the torque is low in FIG. 10 and changed into a block 56.

A dotted arrow mark 91 in FIG. 27 represents running that makes the transition from low-speed low-load running to low-speed middle-load running and that occurs often during the running in an urban area. With the above-described construction, when the running shown by the dotted line 91 occurs, after the running enters the block 52 from the block 55, the time number of shifting of gears can be reduced by performing the running mainly in the ENG(H) mode as explained above. Actually, when the switching map shown in FIG. 26 is used, the shifting of gears occurs in a state shown by x mark 92. In contrast, the shifting of gears does not occur in the present embodiment.

A dotted arrow mark 93 in FIG. 27 represents acceleration for over-take (i.e., transition from middle-speed low-load running to middle-speed middle-load running). When such the running shown by the dotted arrow mark 93 occurs, the time number of the shifting of gears can be reduced by performing the running mainly in the ENG(H) mode as already explained above. Actually, when the switching map shown in FIG. 26 is used, the shifting of gears occurs in a state of x mark 94. In contrast, the shifting of gears does not occur in the present embodiment. Furthermore, when a transition is made from the block 51 to the block 56, only the motor MG1 is operated, so the shifting of gears does not occur.

In this way, in the present embodiment, the time number of shifting of gears can be reduced by using the switching map of FIG. 27, so riding comfort can be improved.

Other Embodiments

The scope of the present invention is not limited to the above-explained embodiments. Rather, the scope of the present invention includes various forms capable of realizing the functions of components that specify the present invention.

(1) For example, the engagement/disengagement of the input side clutch 8 is controlled by the actuator in the above-described embodiments. When the input side clutch 8 is engaged, the driving torque is transmitted from the second engine input shaft 4 to the first motor input shaft 6 (or first motor input shaft 6a) and the driving torque is transmitted from the first motor input shaft 6 (or first motor input shaft 6a) to the second engine input shaft 4. That is, bidirectional transmission of the driving torque is enabled when the input side clutch 8 is engaged.

However, the present invention is not limited thereto. For example, in place of the input side clutch 8 of each embodiment having the above-described construction, a widely known one-way clutch or two-way clutch may be adopted. The one-way clutch or the two-way clutch is fixed such that the driving torque is transmitted only from the second engine input shaft 4 side to the first motor input shaft 6 side (or first motor input shaft 6a side).

By adopting such the one-way clutch or two-way clutch, it becomes unnecessary to control the engagement/disengagement of the input side clutch 8 by using the actuator. As a result, it becomes unnecessary to provide the actuator. It is because the gear mechanism (low gear mechanism or middle gear mechanism) provided on the first motor input shaft 6 side (or first motor input shaft 6a side) has the larger reduction gear ratio than the high gear mechanism provided on the second engine input shaft 4 side.

That is, for example, when the MG1(M)+ENG(H) mode is selected in the fifth embodiment, the rotation speed of the first motor input shaft 6 is higher than the rotation speed of the second engine input shaft 4. Therefore, the one-way clutch idles and provides the same situation as the situation where the input side clutch 8 is disengaged. As a result, the MG1(M)+ENG (H) mode is realized. That is, the different reduction gear ratios can be selected between the motor MG1 and the engine 1.

When the MG1(L)+ENG(L) mode is selected, the driving torque is transmitted from the second engine input shaft 4 to the first motor input shaft 6. Therefore, the MG1(L)+ENG (L) mode is realized. Since the driving torque is not transmitted from the first motor input shaft 6 to the second engine input shaft 4, it becomes impossible to realize the operation mode of the MG1(H) mode and the operation mode combining the MG1(H) mode. However, the efficient running can be performed even without selecting the operation mode of the MG1(H) mode or the operation mode combining the MG1(H) mode as in the EV main mode of the fifth embodiment.

In this way, by adopting the one-way clutch or the two-way clutch as the input side clutch 8, it becomes impossible to realize the MG1(H) mode and the operation mode combining the MG1(H) mode. However, the actuator for the input side clutch 8 can be abolished without deteriorating the gas mileage largely, so the construction and the control of the vehicular power transmission device can be simplified correspondingly.

(2) In each of the above-described embodiments, the damper 3 is provided between the engine 1 and the first drive gear 5. Alternatively, the damper may be abolished, and the first engine input shaft 2 and the second engine input shaft 4 may be integrated.

(3) In each of the above-described embodiments, a clutch may be provided to the second engine input shaft 4 between the damper 3 and the first drive gear 5.

(4) In the above-described fourth embodiment, the second output side clutch 13a and the third output side clutch 13b may be formed integral with each other. In the above-described fifth embodiment, the second output side clutch 13c and the third output side clutch 13d may be formed integral with each other.

(5) The clutches 11, 13, 13a-13d may be attached to the input shaft 4, 6, 6a, 18, 19 side instead of the output shaft 9 side. In this case, the drive gears 5, 7, 7a-7d may be attached to the input shaft rotatably, the driven gears 10, 12, 12a-12d may be attached to the output shaft 9 pivotally, and the clutches 11, 13, 13a-13d may be structured to engage and disengage the input shafts 4, 6, 6a, 18, 19 and the drive gears 5, 7, 7a-7d.

(6) Each of the functions realized by the controller 20 through the execution of the program in each of the above-described embodiments may be realized by using a hardware having such the function (for example, FPGA enabling programming of circuit configuration).

While the invention has been described in connection with what is presently considered to be the most practical and preferred embodiments, it is to be understood that the invention is not to be limited to the disclosed embodiments, but on the contrary, is intended to cover various modifications and equivalent arrangements included within the spirit and scope of the appended claims.

What is claimed is:

1. A vehicular power transmission device that transmits powers generated by an engine, a first motor, and a second motor to an axle of a vehicle, the power transmission device comprising:
    an engine input shaft, to which the power generated by the engine is inputted and which transmits the inputted power of the engine;
    a motor input shaft, to which the power generated by the first motor is inputted and which transmits the inputted power of the first motor;
    an output shaft, to which the power generated by the second motor is inputted, for outputting the power to be transmitted to the axle;
    an engine side gear mechanism provided to the engine input shaft for transmitting the power of the engine input shaft to the output shaft not through the motor input shaft;
    a first motor side gear mechanism provided to the motor input shaft for transmitting the power of the motor input shaft to the output shaft not through the engine input shaft; and
    an input side clutch for engaging and disengaging the engine input shaft and the motor input shaft, wherein
    the engine input shaft and the first motor input shaft are arranged to be coaxial to each other,
    the engine side gear mechanism includes an engine side output side clutch for performing and nonperforming transmission of the power from the engine input shaft to the output shaft,
    the engine side output side clutch is fixed to the output shaft, and
    the power generated by the second motor is transmitted to the output shaft not through the engine side output side clutch.

2. The vehicular power transmission device as in claim 1, wherein
    the engine side gear mechanism includes an engine side driven gear to which the power of the engine input shaft is transmitted,
    the engine side driven gear is supported by the output shaft,
    the first motor side gear mechanism includes a motor side driven gear to which the power of the motor input shaft is transmitted,
    the motor side driven gear is supported by the output shaft,
    the output shaft includes an axle side portion and a motor side portion,
    the axle side portion of the output shaft is located closer to the axle than the motor side driven gear,
    the motor side portion of the output shaft is located closer to the second motor than the motor side driven gear, and
    the engine side output side clutch engages and disengages the engine side driven gear and the axle side portion of the output shaft.

3. The vehicular power transmission device as in claim 1, wherein
    the first motor side gear mechanism includes a motor side output side clutch for performing and nonperforming transmission of the power from the motor input shaft to the output shaft, and
    the motor side output side clutch is fixed to the output shaft.

4. The vehicular power transmission device as in claim 3, wherein
    the first motor side gear mechanism includes a motor side driven gear to which the power of the motor input shaft is transmitted,
    the motor side driven gear is supported by the output shaft, and
    the power generated by the second motor is transmitted to the output shaft not through the motor side output side clutch and the motor side driven gear.

5. The vehicular power transmission device as in claim 3, wherein
    the first motor side gear mechanism includes a motor side driven gear to which the power of the motor input shaft is transmitted,
    the motor side driven gear is supported by the output shaft,
    the output shaft includes an axle side portion and a motor side portion,
    the axle side portion of the output shaft is located closer to the axle than the motor side driven gear,
    the motor side portion of the output shaft is located closer to the second motor than the motor side driven gear, and the motor side output side clutch engages and disengages the motor side driven gear and the axle side portion of the output shaft.

6. The vehicular power transmission device as in claim 1, wherein
when the input side clutch is engaged, the power transmission is enabled between the engine side gear mechanism on the engine input shaft and the first motor side gear mechanism on the motor input shaft.

7. The vehicular power transmission device as in claim 1, wherein
when the input side clutch is disengaged, the power of the engine input shaft and the power of the motor input shaft are enabled to be transmitted to the output shaft at different reduction gear ratios at the same time.

8. The vehicular power transmission device as in claim 1, wherein
a reduction gear ratio of the engine side gear mechanism is smaller than a reduction gear ratio of the first motor side gear mechanism.

9. The vehicular power transmission device as in claim 1, wherein
a reduction gear ratio of the engine side gear mechanism is the smallest among reduction gear ratios of gear mechanisms provided to the vehicular power transmission device, and
a reduction gear ratio of the first motor side gear mechanism is the largest among the reduction gear ratios of the gear mechanisms provided to the vehicular power transmission device.

10. The vehicular power transmission device as in claim 1, further comprising:
a second motor side gear mechanism provided to the motor input shaft for transmitting the power of the motor input shaft to the output shaft not through the engine input shaft, wherein
a reduction gear ratio of the first motor side gear mechanism and a reduction gear ratio of the second motor side gear mechanism are larger than a reduction gear ratio of the engine side gear mechanism.

11. The vehicular power transmission device as in claim 1, wherein
the engine side gear mechanism is arranged between the first motor side gear mechanism and the engine.

12. The vehicular power transmission device as in claim 11, wherein
the input side clutch is arranged between the engine side gear mechanism and the first motor side gear mechanism.

13. The vehicular power transmission device as in claim 11, wherein
the input side clutch is arranged between the first motor and the first motor side gear mechanism,
the motor input shaft includes a cylindrical motor input shaft fixed to a portion of the input side clutch that rotates with the motor input shaft,
the cylindrical motor input shaft surrounds another portion of the input side clutch that rotates with the engine input shaft and extends toward the engine to surround the engine input shaft,
the cylindrical motor input shaft is structured to rotate with the other part of the motor input shaft, and
the first motor side gear mechanism is fixed to an end portion of the cylindrical motor input shaft closer to the engine between two end portions of the cylindrical motor input shaft.

14. The vehicular power transmission device as in claim 11, wherein
the input side clutch is arranged between the engine and the engine side gear mechanism,
the engine input shaft includes a cylindrical engine input shaft fixed to a portion of the input side clutch that rotates with the engine input shaft,
the cylindrical engine input shaft surrounds another portion of the input side clutch that rotates with the motor input shaft and extends toward the motor to surround the motor input shaft,
the cylindrical engine input shaft is structured to rotate with the other part of the engine input shaft, and
the engine side gear mechanism is fixed to an end portion of the cylindrical engine input shaft closer to the first motor between two end portions of the cylindrical engine input shaft.

15. The vehicular power transmission device as in claim 1, wherein
the first motor is arranged between the engine and the first motor side gear mechanism, and
the engine side gear mechanism is arranged on a farther side of the first motor side gear mechanism from the engine.

16. The vehicular power transmission device as in claim 15, wherein
the input side clutch is arranged between the first motor and the engine.

17. The vehicular power transmission device as in claim 15, wherein
the input side clutch is arranged between the engine side gear mechanism and the first motor side gear mechanism.

18. The vehicular power transmission device as in claim 1, wherein
the input side clutch is a clutch that transmits driving torque only from the engine input shaft to the motor input shaft, and
a reduction gear ratio of the motor side gear mechanism is larger than a reduction gear ratio of the engine side gear mechanism.

19. The vehicular power transmission device as in claim 1, further comprising:
a controller for controlling transmission routes and reduction gear ratios of the powers generated by the engine and the first motor by controlling the engagement/disengagement of the input side clutch, the motor side gear mechanism and the engine side gear mechanism based on a physical quantity obtained within the vehicle, wherein
the controller selects operation modes of the engine and the first motor allotted to the obtained physical quantity based on a predetermined switching map that allots the operation modes to a value of the physical quantity and realizes the selected operation modes by controlling the engagement/disengagement of the input side clutch, the motor side gear mechanism and the engine side gear mechanism.

20. The vehicular power transmission device as in claim 19, wherein
the first motor rotates using an electric power of a battery mounted to the vehicle for driving the vehicle,
the controller stores a plurality of kinds of switching maps beforehand,
the controller obtains SOC, or a state of charge, of the vehicle driving battery, and the controller selects one of the plurality of kinds of switching maps based on the obtained SOC.

21. The vehicular power transmission device as in claim 1, wherein the output shaft is directly connected to an output shaft of the second motor.

22. A vehicular power transmission device that transmits powers generated by an engine, a first motor, and a second motor to an axle of a vehicle, the power transmission device comprising:

an engine input shaft, to which the power generated by the engine is inputted and which transmits the inputted power of the engine;

a motor input shaft, to which the power generated by the first motor is inputted and which transmits the inputted power of the first motor;

an output shaft, to which the power generated by the second motor is inputted, for outputting the power to be transmitted to the axle;

an engine side gear mechanism provided to the engine input shaft for transmitting the power of the engine input shaft to the output shaft not through the motor input shaft;

a first motor side gear mechanism provided to the motor input shaft for transmitting the power of the motor input shaft to the output shaft not through the engine input shaft; and an input side clutch for engaging and disengaging the engine input shaft and the motor input shaft, wherein the engine input shaft and the first motor input shaft are arranged to be coaxial to each other, the engine side gear mechanism includes an engine side output side clutch for performing and nonperforming transmission of the power from the engine input shaft to the output shaft, the engine side output side clutch is fixed to the output shaft, the engine side gear mechanism includes an engine side driven gear to which the power of the engine input shaft is transmitted, the engine side driven gear is supported by the output shaft, and the power generated by the second motor is transmitted to the output shaft not through the engine side output side clutch and the engine side driven gear.

* * * * *